(12) United States Patent
Farrington

(10) Patent No.: US 10,061,044 B2
(45) Date of Patent: Aug. 28, 2018

(54) SYSTEMS, METHODS, AND SOFTWARE FOR DETECTING THE PRESENCE OF SUBTERRANEAN TUNNELS AND TUNNELING ACTIVITY

(71) Applicant: Transcend Engineering and Technology, LLC, Bethel, VT (US)

(72) Inventor: Stephen P. Farrington, Stockbridge, VT (US)

(73) Assignee: Transcend Engineering and Technology, LLC, Bethel, VT (US)

(*) Notice: Subject to any disclaimer, the term of this patent is extended or adjusted under 35 U.S.C. 154(b) by 127 days.

(21) Appl. No.: 15/094,549

(22) Filed: Apr. 8, 2016

(65) Prior Publication Data

US 2017/0074088 A1 Mar. 16, 2017

Related U.S. Application Data

(60) Provisional application No. 62/114,545, filed on Feb. 10, 2015.

(51) Int. Cl.
*G01V 1/00* (2006.01)
*G01V 1/30* (2006.01)

(52) U.S. Cl.
CPC ...... *G01V 1/001* (2013.01); *G01V 2210/1295* (2013.01); *G01V 2210/1429* (2013.01)

(58) Field of Classification Search
CPC ... G01V 1/001; G01V 1/282; G01V 2210/614
See application file for complete search history.

(56) References Cited

U.S. PATENT DOCUMENTS

| 8,659,424 | B2 | 2/2014 | Krumhansl et al. | |
| 2002/0193952 | A1* | 12/2002 | Shobayashi | G01M 3/40 702/51 |
| 2008/0033656 | A1* | 2/2008 | Herwanger | E21B 41/0064 702/18 |

(Continued)

OTHER PUBLICATIONS

Alcudia León, Alejandro David. Microphone and geophone data analysis for noise characterization and seismic signal enhancement. Diss. University of Calgary, 2009.*

*Primary Examiner* — Daniel S Larkin
*Assistant Examiner* — Herbert K Roberts
(74) *Attorney, Agent, or Firm* — Downs Rachlin Martin PLLC

(57) ABSTRACT

Apparatus and methods for detecting subsurface tunnels employ an aboveground air pressure sensor and one or more subsurface air pressure sensors. The output of the aboveground sensor forms the input to a numerical model whose input parameters account for the effects of depth and permeability and porosity of the earth on the propagation of pressure variations from the surface to the location of each subsurface sensor. Tunnels are detected on the basis of a growing deviation between measured and modeled subsurface pressures using static model input parameters, or on the basis of changes in the model input parameters required to continue accurately approximating measured subsurface pressures, or on the basis of spatially anomalous values of the model input parameters corresponding to multiple horizontally separated subsurface sensors.

24 Claims, 15 Drawing Sheets

(56) References Cited

U.S. PATENT DOCUMENTS

| | | | | |
|---|---|---|---|---|
| 2008/0236270 A1* | 10/2008 | Denichou | ............... | G01V 11/00 73/152.16 |
| 2010/0211370 A1* | 8/2010 | Maliassov | ............... | G01V 11/00 703/10 |
| 2012/0232797 A1* | 9/2012 | Frenkel | .................... | G01V 3/06 702/2 |
| 2012/0243373 A1* | 9/2012 | Shin | ........................ | G01V 1/282 367/73 |
| 2012/0263016 A1* | 10/2012 | Shin | ......................... | G01V 1/30 367/73 |
| 2012/0314538 A1* | 12/2012 | Washbourne | ............ | G01V 1/30 367/49 |
| 2013/0041589 A1* | 2/2013 | Auger | ...................... | G01V 1/28 702/14 |
| 2013/0138408 A1* | 5/2013 | Lee | ......................... | G06F 17/16 703/2 |
| 2013/0338922 A1* | 12/2013 | Yarman | .................... | G01V 1/30 702/6 |
| 2014/0052379 A1* | 2/2014 | McVay | ................. | G01V 1/306 702/18 |
| 2014/0236487 A1* | 8/2014 | Kimman | ................ | G01V 1/288 702/18 |
| 2015/0281881 A1* | 10/2015 | Appleby | ................. | E21C 39/00 715/848 |
| 2016/0025878 A1* | 1/2016 | Shin | ....................... | G01V 1/282 367/7 |
| 2016/0061795 A1* | 3/2016 | Schultz | ............... | G01N 33/004 702/24 |
| 2016/0282490 A1* | 9/2016 | Qin | ........................ | G01V 1/282 |
| 2016/0320505 A1* | 11/2016 | D'Afonseca | ............ | G01V 1/282 |
| 2017/0031041 A1* | 2/2017 | Ratcliffe | ................. | G01V 1/282 |
| 2017/0115411 A1* | 4/2017 | Zhang | ..................... | G01V 1/282 |
| 2017/0145804 A1* | 5/2017 | Wessling | ................ | E21B 44/00 |

* cited by examiner

FIG. 1  Schematic Drawing of a Monitoring Network
Employing the Present Invention
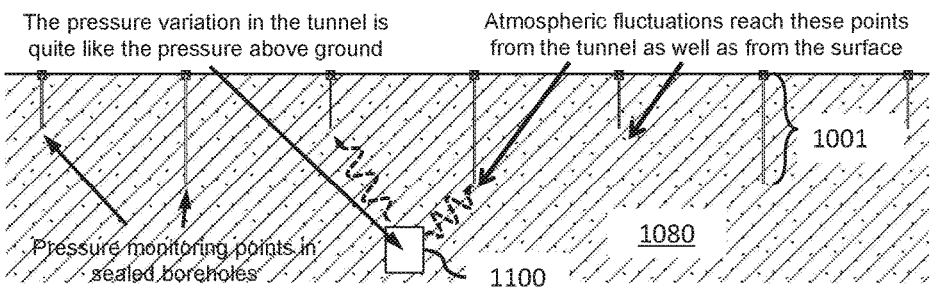
Close-Up Schematic of Two Monitoring Points
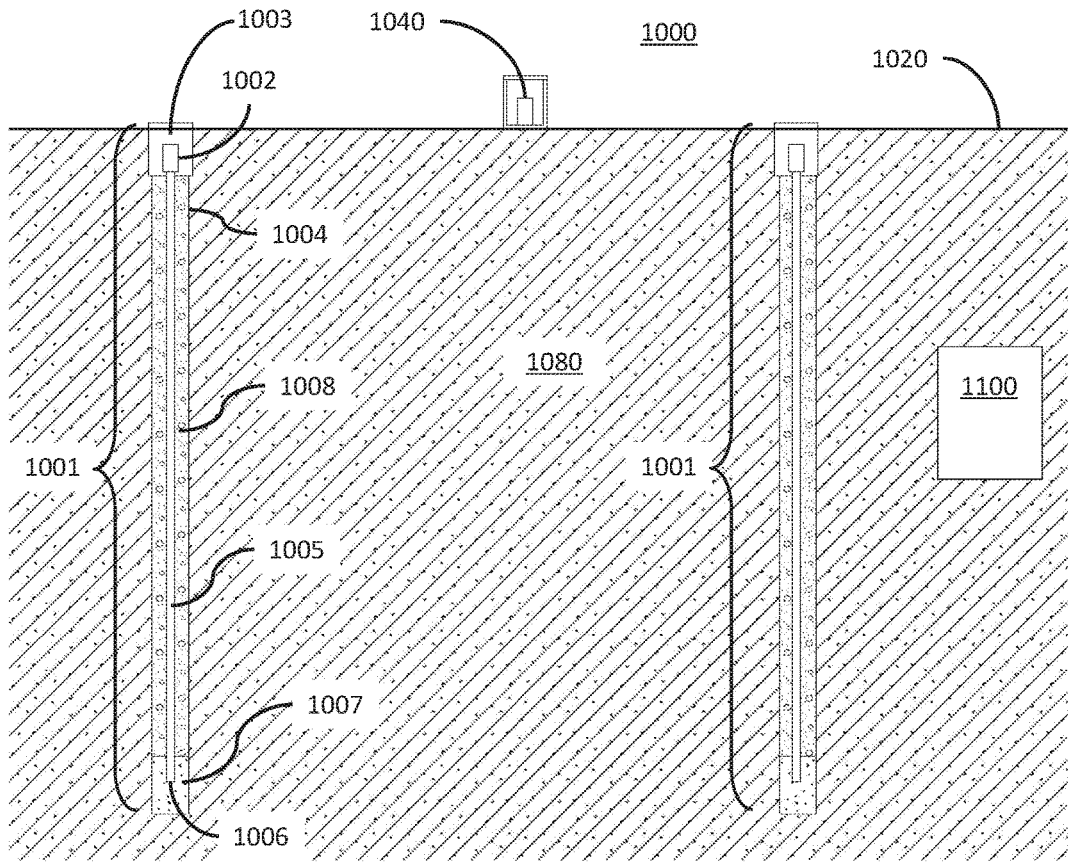

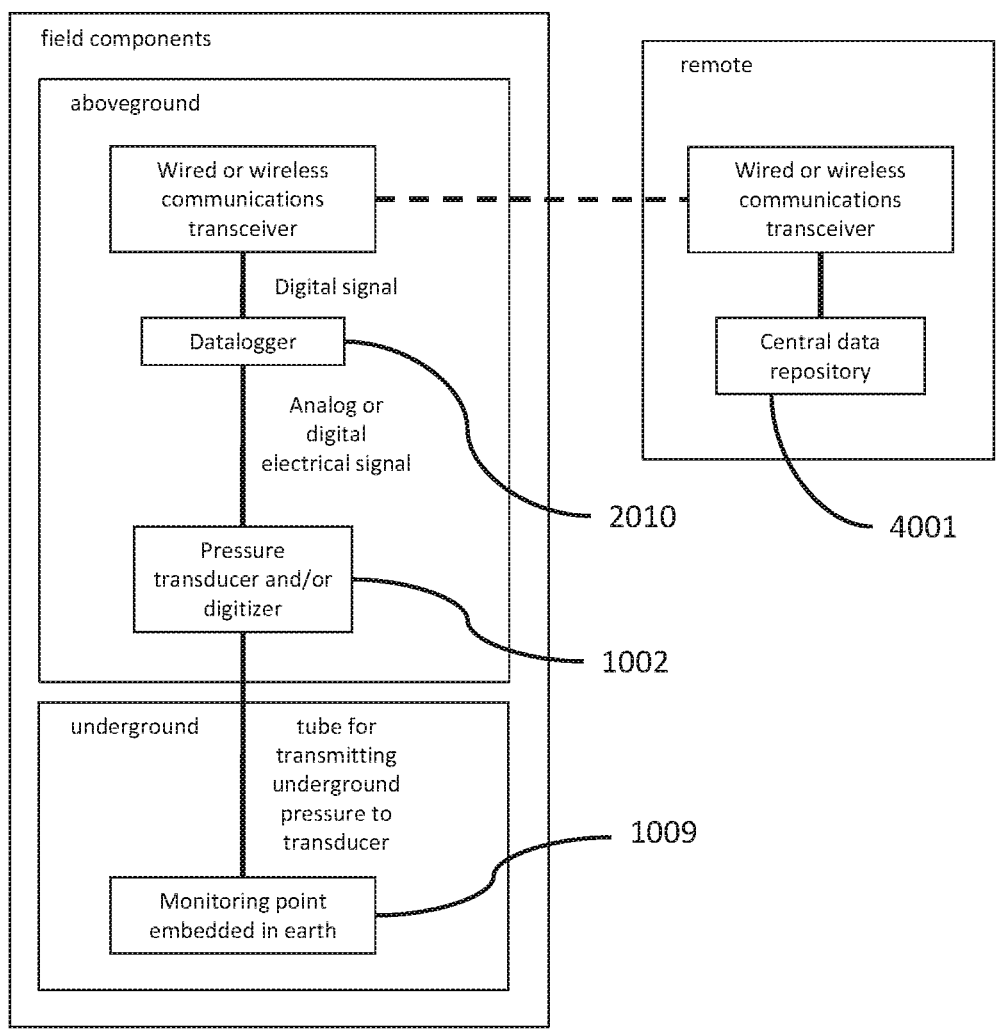
FIG. 2  Block Diagram of Apparatus for Obtaining Subsurface Pressure Measurements FIG. 4  Block diagram of process relationships and interactions FIG. 5  Environmental Measurement Flowchart FIG. 6  Model Calibration Flowchart FIG. 7  Flowchart of Process for Producing Time Series of Calibrated Lumped Parameter Values FIG. 8  Procedure for Detecting a Tunnel from Time Series of Calibrated Lumped Parameter Values FIG. 10 graph demonstrating the effectiveness of a lumped parameter model in the form of a one-dimensional finite difference model of the diffusion equation in modeling the subsurface pressure signal from the surface pressure signal FIG. 11  graph demonstrating the effectiveness of a lumped parameter model in the form of a first-order recursive exponential filter in modeling the subsurface pressure signal from the surface pressure signal FIG. 12    plot of a time series of a calibrated lumped model
           parameter as would be produced using the procedure
           described in the flowchart of FIG. 5

FIG. 13    graph showing the deviation between measured
surface pressures and modeled subsurface pressures
and the deviation between measured subsurface
pressures and modeled subsurface pressures using a
first-order recursive exponential filter to model of
subsurface pressures FIG. 14    graph showing the deviation between measured
surface pressures and modeled subsurface pressures
and the deviation between measured subsurface
pressures and modeled subsurface pressures using a
one-dimensional finite difference model of the
diffusion equation to model subsurface pressures

SYSTEMS, METHODS, AND SOFTWARE FOR DETECTING THE PRESENCE OF SUBTERRANEAN TUNNELS AND TUNNELING ACTIVITY

RELATED APPLICATION DATA

This application claims the benefit of priority of U.S. Provisional Patent Application Ser. No. 62/114,545, filed on Feb. 10, 2015, and title "Apparatus and Method For Detecting The Presence of Subterranean Tunnels And Tunneling Activity," which is incorporated by reference herein in its entirety.

FIELD OF THE INVENTION

This disclosure relates to tunnel detection, and in particular to detecting subterranean tunnels as well as tunneling activity.

BACKGROUND

Governments, prisons, military bases, and other secure facilities have an interest in securing ports of entry, borders, and boundaries from people and goods that are prohibited or that threaten their citizens, operations, infrastructure, resources or food supply. Clandestine underground tunnels, however, provide a means of surreptitiously crossing national borders and other security boundaries. For example, in the Unites States, a new border tunnel has historically been discovered every 3-6 months. In November of 2003 in Calexico, Calif., U.S. Department of Homeland Security officials uncovered a cross-border tunnel about 15 feet underground just 200 yards east of a similar tunnel they had unearthed two months earlier. Both tunnels had sophisticated lighting and ventilation systems. In addition to smuggling prohibited goods and humans across political boundaries, clandestine tunneling is historically a means by which detainees have successfully escaped imprisonment. A noteworthy instance of this was the July 2015 escape of international drug kingpin Joaquin "El Chapo" Guzman from a Mexican prison through a mile-long tunnel dug beneath his prison cell. Detection of clandestine tunnels and tunneling activity is therefore a high priority for security on scales ranging from national borders to facility boundaries. Many parties, including the U.S. Department of Homeland Security, have shown considerable interest in sensors and sensor systems that can detect and locate existing tunnels or new tunneling activity, or both.

Existing approaches to tunnel detection can be broadly categorized as either active or passive. Active approaches, such as ground penetrating radar (GPR) or seismic interrogation methods, generally examine the response of the subsurface environment to a signal from an active source. The strength, travel time, and phase of returned signals are interpreted via geophysical inversion techniques to create a 3D image of the structure of some property of the subsurface soil or rock, in hopes of identifying anomalies that may represent tunnels. In contrast, passive approaches attempt to detect physical signals generated by tunneling and tunnel use. Such signals include the seismic and acoustic energy generated by tunneling operations, acoustic emissions from tunnel use, or the electromagnetic signature of lighting and other equipment used in tunnels. Gravity gradiometers may attempt to identify minute gravitational anomalies associated with tunnels, and still more indirectly, coherent change detection using synthetic aperture radar (SAR) might detect ground subsidence due to underlying tunneling activity.

None of these methods is appropriate for detecting all tunnels in all geologic and cultural settings. Challenges to the effectiveness of active methods include: (a) they are difficult to apply clandestinely, (b) signal penetration and imaging resolution diminish with depth of investigation, (c) urban clutter and cultural noise can interfere or interact with interrogation signals to confound interpretation, (d) geophysical inversion of data generally imposes a high computational burden and cannot be performed real-time, and (e) subsurface structural anomalies identified can be caused by many things other than tunnels. In addition to some of the weaknesses of active methods, passive methods have their own set of challenges: cultural noise may interfere with passive signals, their strength generally diminishes as tunnel depth increases, and processing and interpretation of passive monitoring data is generally resource intensive and confounded by uncertainty and heterogeneity in the signal transmission characteristics of the subsurface medium.

The effectiveness of any given technique, both active and passive, also varies tremendously as a function of the geologic setting. Electrically conductive soils diffuse and absorb radar and other electromagnetic signals, weak or compressible soils absorb and attenuate seismic and acoustic energy, fractures and other structural variations reflect and refract propagating waves, etc. Practitioners in the art therefore widely recognize that no universal technological solution is yet available for detecting clandestine tunnels and tunneling activity.

SUMMARY OF THE DISCLOSURE

Aspects of the present disclosure are directed to tunnel sensing systems and methods that can be tailored to local environmental factors. Aspects of the present disclosure fill capability gaps and weaknesses that remain in the available technologies for tunnel detection.

An aspect of the present disclosure is a passive sensing system for detecting tunneling activity by measuring and analyzing fluctuations in subsurface soil gas pressure in relation to the fluctuations in surface atmospheric pressure that induce such subsurface fluctuations.

Aspects of the present disclosure exploit the damping effect of soil and rock on the transmission of constant natural fluctuations in atmospheric pressure to depth in order to determine when and where the subterranean regime has been altered by the introduction of a tunnel. Introduction of a tunnel results in less damping of the atmospheric pressure fluctuations in the vicinity of the tunnel.

Using a time series of measured atmospheric pressure as input to a numerical model, aspects of the present disclosure teach numerically modeling expected subsurface pressure time series at a borehole-based monitoring point or a plurality of borehole-based monitoring points. One numerical model that can be used for this purpose is a lumped parameter time domain model that represents the combined effects of formation permeability and porosity, air viscosity, and distance through the geologic formation in a single lumped parameter. The value of this single lumped parameter can be calibrated to represent local geology using an initial baseline period of surface and subsurface pressure measurements. Another numerical model that can be used for this purpose is a frequency domain filter that mimics the combined effects of formation permeability and porosity, air viscosity, and distance through the geologic formation on the aboveground pressure signal during transmission through the ground by multiplying the Fourier transformed aboveground pressure signal by the filter function in the Fourier domain. This model can be calibrated by determining the filter function representing a frequency dependent lumped parameter, which can be performed by dividing the subsurface pressure by surface pressure in the Fourier domain. Other numerical models are also suitable for modeling expected time series of subsurface pressure from a time series of measured atmospheric pressure.

If model calibration reveals spatially anomalous subsurface pressure dynamics, these may indicate the presence of a pre-existing tunnel whose location can be inferred from the spatial variability of the calibrated lumped parameter. During continued monitoring, if a change in the value of the properties represented by the lumped parameter occurs over time, this indicates the introduction of a tunnel into the subsurface region being monitored. Such a change over time may be detected by either detecting an increasing disagreement between measured subsurface pressure variation and those predicted by the calibrated model or by detecting a drift in the value of the lumped parameter resulting from continuous recalibration to best fit model output to recent monitoring history.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a schematic drawing of a vertical cross section through the ground showing a portion of a monitoring network employing the present disclosure;

FIG. 2 is a block diagram of a typical embodiment of an apparatus for obtaining time series measurements of subsurface soil gas pressure;

DETAILED DESCRIPTION

Figure 3:
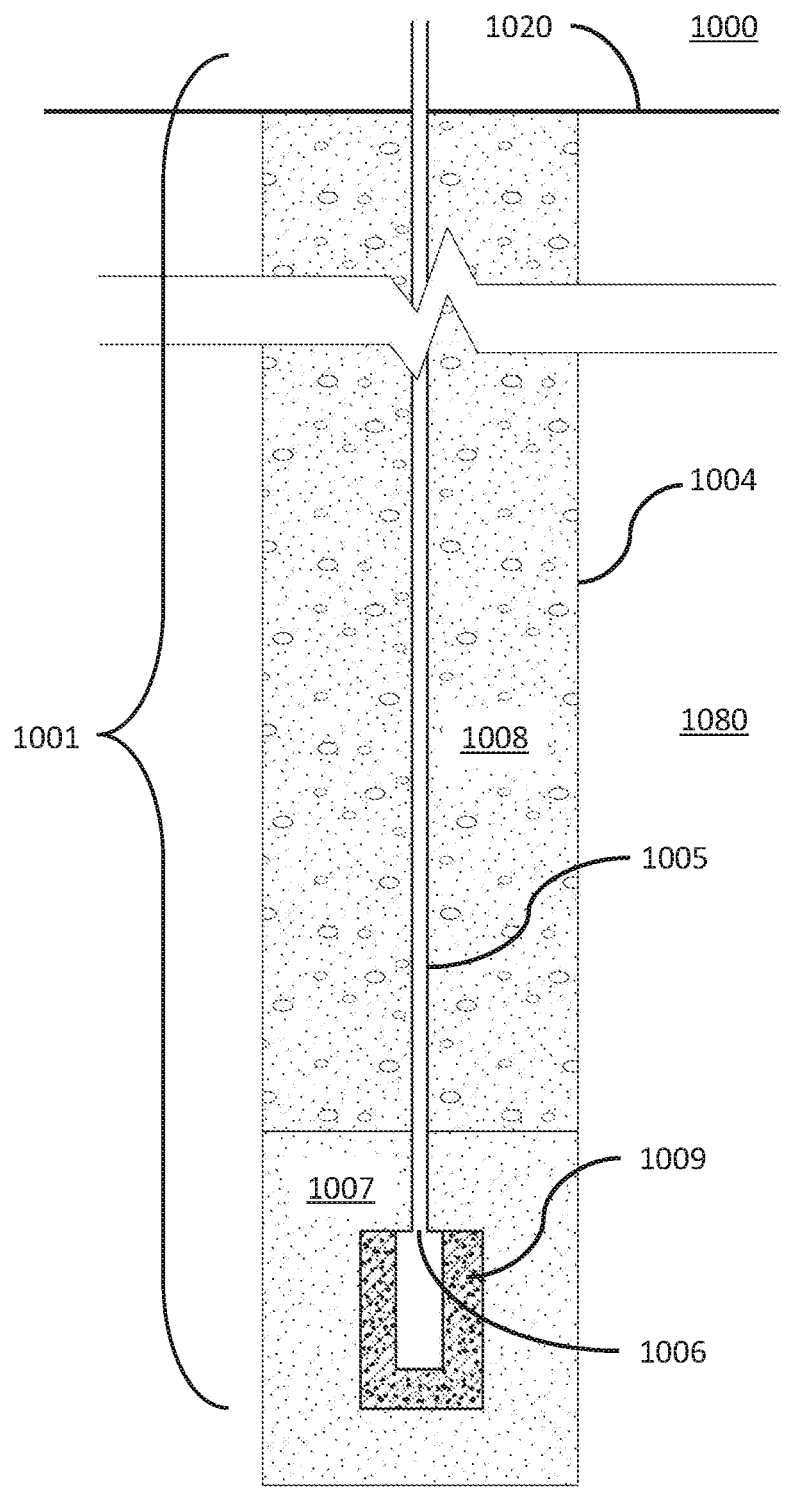
FIG. 3 is a schematic diagram of a subsurface pressure monitoring point installed below ground in a borehole.

The present disclosure is related to the technical field of data processing: measuring, calibrating, or testing. More particularly, aspects of the present disclosure are directed to a sensing system and method for detecting subsurface tunnels, voids, shafts, underground facilities, and underground tunneling and construction activity beneath the surface of the earth.

U.S. Pat. No. 8,659,424 B2, titled "Subsurface intrusion detection system," is incorporated by reference herein for its teachings of detecting subsurface activity based on a comparison of features of a first vibration signal measured at a first depth relative to the surface and a second vibration signal measured at a second depth relative to the surface during corresponding time windows.

The present disclosure provides, among other things, a method and system for detecting the presence or introduction of a tunnel into the subsurface environment, including a general location of the tunnel within that environment, and activity relating to tunneling. As used herein, the term tunnel is generally used to refer to any void constructed or created beneath the ground surface for the storage or passage of persons, animals, goods or property of any kind.

Aspects of the methods disclosed herein may be carried out in a computer, and software may implement or aid in performing the disclosed concepts, such as set forth in the example computer programs below. The software may be executable by a special-purpose computer, which may comprise a general-purpose computer programmed to perform one or more of the functions described herein. In operation, the software (computer code) and data to be processed to perform the tunnel detection methods disclosed herein are stored within a general-purpose computer platform, the storage of such transforming such a general-purpose computer into a special-purpose computer. The software as well as any data may be stored on a computer-readable medium (e.g., memory). The software constitutes instructions to be carried out by a processor in the computer to cause the processor to perform some or all of the calculations as described herein and otherwise process the collected data. As used herein, terms such as computer or machine "readable medium" refer to any medium that stores data and/or that participates in providing instructions to a processor for execution. Such a medium may take many forms, including but not limited to, non-volatile media, volatile media, and transmission media as known in the art of computing. The computer-readable medium may be used to store data that forms one or more electronic databases.

Soil is a three-component mixture of materials in solid, gaseous, and liquid phases. The solid phase consists of soil particles which pack to form a structure or matrix having interconnected pore spaces. These pores contain liquid (water) and/or gas (air) whose pressure is influenced by atmospheric pressure above ground due to compression, decompression, and flow of soil gas through the connected pore spaces in the soil matrix. Rock is similarly permeated by connected pores and additionally by fractures, which convey pressure changes from the aboveground atmosphere to the subsurface.

Local atmospheric pressure above the ground surface fluctuates naturally on a principally diurnal cycle with other higher and lower frequencies also present due to atmospheric tides, cyclic heating and cooling of the atmosphere, seasonal temperature variations, and the constant movement of weather patterns. This natural fluctuation of pressure propagates into the earth via transport, and changes to the density, of compressible gas in the soil pore space. The compression, decompression, and transport of gas through rock and soil are resisted by friction with the soil and rock solids and the tortuosity of the flow paths through the subsurface, such that the pressure fluctuations reaching any given depth below the ground surface are delayed and attenuated relative to the fluctuations in the atmosphere above. It has long been recognized that this phenomenon can be used to characterize the permeability of soil and rock in the earth by matching the output of numerical models of the temporal variation in soil gas pressure at depth due to atmospheric forcing to time series measurements of subsurface soil gas pressures. Aspects of the present disclosure exploit this well-known physical principle to determine when the subsurface pressures have been affected by the introduction of a tunnel or other surface-connected void or other processes, such as drilling, that cause subsurface pressure disruptions.

When a tunnel is constructed into the subsurface, it provides a conduit for more direct pneumatic communication between the soil gas below ground and the aboveground atmosphere than would exist naturally through the earth. Thus, in the presence of a nearby tunnel, variations in subsurface soil gas pressures are attenuated and delayed relative to the atmosphere less than they would be in the absence of a nearby tunnel. Subsurface soil gas pressures proximate to a subsurface pneumatic drilling operation will exhibit sharp excursions from a causal relationship to aboveground atmospheric pressures.

Aspects of the present disclosure detect the introduction of a tunnel by measuring atmospheric and subsurface air pressures, numerically modeling the subsurface pressure variations that result from the influence of the earth on measured atmospheric pressure at the subsurface measurement location, and monitoring for a deviation between the modeled subsurface pressures and the measured subsurface pressures that would be indicative of the introduction of a tunnel or indicative of drilling activity. It can be applied to measurements acquired at one or more horizontal locations and one or more depths in the subsurface. If applied to a plurality of measurements acquired at a plurality of subsurface locations, then the spatial variability of the degree of deviation between modeled and measured subsurface pressures can be used to estimate the location and orientation of a detected tunnel. Additionally, the temporal evolution of spatial variability in the degree of deviation between modeled and measured subsurface pressures can be used to estimate the location, orientation, and construction progress of a detected tunnel.

FIG. 1 is a schematic drawing of a vertical cross section through the ground showing a portion of a monitoring network comprising a plurality of monitoring points and includes a close-up view (lower portion of FIG. 1) showing two such points where a subsurface pressure monitoring apparatus 1001 may be used. Many more such points may be employed in practical application. Each monitoring point may comprise a borehole 1004 within the native geologic material 1080 to provide access to pressures at depth via a tube 1005 inserted in the borehole 1004 with an inlet 1006 at its bottom end open to a highly permeable material such as coarse sand 1007 that may be added to the borehole, above which an impermeable fill material 1008 such as cement, cement-bentonite grout, or another colloidal or clay rich material, among others, may be added to prevent direct pneumatic communication of the atmosphere 1000 with the environment at depth. The tube 1005 is sealed such that it is airtight except for inlet 1006 and transmits soil gas pressure at depth to a pressure transducer 1002 housed in a protective enclosure 1003 at or just below the ground surface 1020. FIG. 1 also shows that such a monitoring network may include a pressure transducer 1040 situated above the ground surface 1020 for measuring the pressure of the atmosphere 1000. The pressure sensing components may be connected as shown in FIG. 2 to datalogging equipment and a central data repository. Appropriate horizontal spacing between monitoring points may be 10 to 100 meters and could in some cases be spaced closer or farther from one another depending on the prevailing geologic conditions as well as the expected depth of the potential tunnel threat. Appropriate depths of monitoring points may be from 1 to 10 meters or more depending on the prevailing geologic conditions as well as the expected depth of the potential tunnel threat. The presence of a tunnel 1100 will bring pressure fluctuations to monitoring point inlet 1006 by an additional and different path through the geologic materials 1080 with different net filtering effect than the path by which pressure fluctuations in the atmosphere are normally received at the inlet.

A basic apparatus for collecting time series measurements of subsurface and surface pressure as input to the method described would be recognizable to one of ordinary skill in the art. As shown in the block diagram of FIG. 2 as field components, one such apparatus may include a sintered stainless steel filter 1009 or a passive drive point piezometer (Solinst model 615) embedded in the subsurface and connected via a tube to an above ground pressure transducer (Vaisala model PTB 110) or an embedded drive point piezometer with built-in pressure transducer (Geokon model 4500DP). Measurements may be recorded in a local datalogger and may be transmitted via wired or wireless telemetry or by other means to a central repository for analysis.

FIG. 3 is a schematic diagram of a subsurface pressure monitoring apparatus 1001 comprising: a sintered stainless steel filter 1009 embedded in permeable sand 1007 placed in a borehole 1004 and sealed from direct atmospheric influence by impermeable cement or cement-bentonite grout 1008 placed above the sand. The monitoring point, in pneumatic communication with the geologic formation at depth via a length of incompressible (e.g., ⅛-inch diameter stainless steel) tubing 1005, which is open at its base 1006 to the filter, is thence attached, as shown in FIG. 2, to a pressure transducer 1002 and an aboveground datalogger (e.g., Campbell Scientific model CR1000) 2010 which collects periodic, e.g., every five minutes, measurements from the pressure transducer, caches them in local memory, and transmits them to a central database 4001 via a wired or wireless data communications link, such as a serial RS-485, RS-232 or Ethernet connection, data radio, cellular data modem, wireless mesh network, wireless internet connection, or satellite data modem. Fully integrated wireless pressure transmitter systems are also commercially available (e.g., Newport Electronics, Inc. model DPG409-26HA-W) for obtaining, storing, and transmitting absolute, gauge, or differential pressure measurements.

Figure 4:
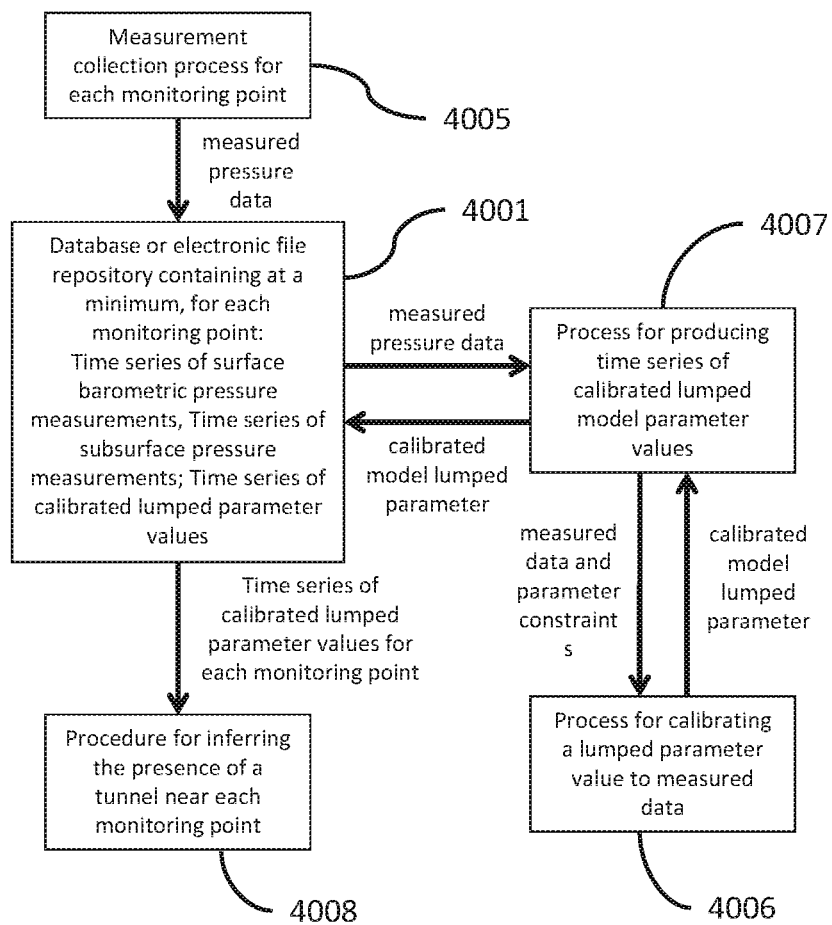
FIG. 4 is a block diagram showing the interactions between various procedures and a database of measured and computed data.
Figure 5:
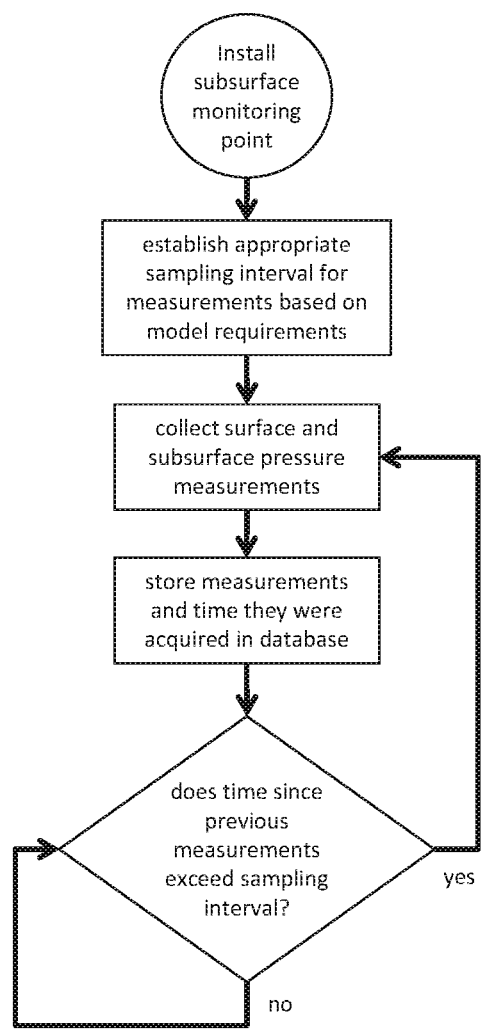
FIG. 5 is a flowchart describing the continuous collection of subsurface pressure measurements.

One process for acquiring time series measurements of pressures above and below ground is depicted in FIG. 5 also depicted as one element 4005 in the block diagram of process relationships and interactions depicted in FIG. 4. The process depicted in the flow chart of FIG. 5 begins with installation of the surface and subsurface monitoring points and is followed by selection of an appropriate sampling interval for collecting the time series pressure data needed to support other processes depicted in FIG. 4. Experience in one instance has shown that an interval of five minutes provides characterization of pressure fluctuations sufficient to support the other processes disclosed herein for detecting a tunnel. Longer or shorter intervals may be appropriate in other instances, depending on atmospheric dynamics, geologic conditions, and characteristics of the tunnel being detected. The remainder of the process for obtaining environmental measurements depicted in FIG. 5 consists of continuing to acquire measurements from one or more surface, e.g., aboveground, and subsurface locations on the chosen interval and storing such measurements in an electronic database, data file, computer memory, or other format that can be used immediately or later as input to other processes 4006, 4007, 4008 depicted in FIG. 4. A process such as that depicted in FIG. 5 may continue indefinitely as long as the objective of detecting tunnels remains. The chosen sampling interval may be adjusted at any time in the process to yield more appropriate data than the initial choice of interval.

Converting differential or gauge pressure measurements of the soil gas at depth to absolute pressure by subtracting measured barometric pressure is accomplished using conventional means known in the art. Use of an absolute pressure gauge will not require this conversion. Received pressure measurement data are stored in an electronic database or electronic file format (4001 in FIG. 2 and FIG. 4) accessible by software that implements the lumped parameter modeling and tunnel detection procedures described below.

Various methods have been developed that are usable to determine the porosity and permeability of subsurface media by analyzing the time lag of pressure changes at depth relative to those at the surface. There are numerous ways to model the pressure signal at depth from the aboveground pressure signal. The propagation of small variations of gas pressure in a dry porous medium can be described by a diffusion equation in pressure, analogous to temperature or chemical diffusion.

$$\frac{\partial^2 P^2}{\partial z^2} = \frac{\mu \theta}{k P_{00}} \frac{\partial P}{\partial t}$$

in which:
P represents air pressure,
$P_{00}$ represents the long-term time-averaged air pressure at the location,
θ represents the air-filled porosity of the medium (as a volume fraction),
μ represents the viscosity of air,
k represents the air permeability of the medium,
t represents time, and
z represents depth below the ground surface.

The diffusion equation can be derived in a straightforward manner from the continuity equation, which states that a change in density in any part of the system is due to inflow and outflow of material into and out of that part of the system. In the case of pressures in porous media, the density at any given depth is a function of inflow and outflow ultimately from the atmosphere at the surface.

Other mathematically equivalent equations have been developed, which also account for a reduction in the net porosity due to moisture in the porous medium and a scalar change in the air permeability to adjust for a moist versus dry porous medium, as well as for temperature, humidity, and depth related variation in gas density.

However, for the purposes of tunnel detection as applied in the current disclosure, the porosity and permeability of the medium, as well as the viscosity of air and the depth of a pressure measurement location below ground all remain relatively constant, so the diffusion equation can be simplified as:

$$\frac{\partial^2 P^2}{\partial z^2} = D' \frac{\partial P}{\partial t}$$

in which:
D' represents a bulk diffusion constant
P represents air pressure,
t represents time, and
z represents depth below the ground surface.

The diffusion equation can be solved numerically by discretizing both space and time in the problem domain and approximating the derivatives by finite differences. Using a first-order central difference formula in space to approximate the second derivative of pressure with respect to depth, gives:

$$\frac{\partial^2 P^2}{\partial z^2} \approx \frac{P(z+\Delta z, t) - 2P(z, t) + P(z-\Delta z, t)}{(\Delta z)^2}$$

$$P_{zz}(z, t) = \frac{P(z+\Delta z, t) - 2P(z, t) + P(z-\Delta z, t)}{(\Delta z)^2}$$

Applying a first-order backward difference formula to approximate the first order derivative of pressure with respect to time gives:

$$\frac{\partial P}{\partial t} \approx \frac{P(z, t+\Delta t) - P(z, t)}{\Delta t}$$

$$P_t(z, t) = \frac{P(z, t+\Delta t) - P(z, t)}{\Delta t}$$

Combining the two difference approximations and changing to standard finite difference formulation notation yields the numerical formulation:

$$\frac{P_{i+1}^{(j)} - 2P_i^{(j)} + P_{i-1}^{(j)}}{(\Delta z)^2} = D' \frac{P_i^{(j+1)} - P_i^{(j)}}{\Delta t}$$

in which the subscript in i is standard for representing the index of a spatial node in the computational grid comprising m spatial nodes and the superscript in j in parentheses is standard for representing the index of a temporal node. The above equation is rearranged to solve for the value of pressure at each depth (spatial node, i), for each new time step, j+1, in the computation, in terms of the value of pressure at that node, i, and at those nodes above and below it, i−1 and i+1, during the previous time step, j.

$$P_i^{(j+1)} = P_i^{(j)} + \frac{\Delta t}{D'(\Delta z)^2}\left(P_{i+1}^{(j)} - 2P_i^{(j)} + P_{i-1}^{(j)}\right)$$

Solution requires that boundary conditions be applied to the computational domain. The pressure at the surface boundary (node i=0) is always the measured atmospheric pressure, ($P_0^{(j)} = P_{atm}^{(j)}$). The deep boundary condition ($m^{th}$ spatial node) can be handled by substituting an upwind difference for the central difference in the spatial derivative.

$$P_m^{(j+1)} = P_m^{(j)} + \frac{\Delta t}{D'(\Delta z)^2}\left(P_m^{(j)} - 2P_{m-1}^{(j)} + P_{m-2}^{(j)}\right)$$

For the numerical solution to remain stable, $\Delta t < D'(\Delta z)^2/2$, or expressed differently, $$\frac{\Delta t}{D'(\Delta z)^2} < 0.5.$$

The diffusion equation can also be solved by any of numerous finite difference formulations, including Crank-Nicholson, Adams-Bashforth-Moulton, and others. The present description describes only one such method by way of example. In this method, the quantity $\Delta t/D'(\Delta z)^2$ is a lumped parameter that includes the formation porosity and permeability and the viscosity of air, in D', and the distance over which pressure diffuses through the formation, a fixed multiple of $\Delta z$, the spacing between finite difference nodes. Thus a change in any of the geologic properties or dimensions of the domain affecting diffusion of pressure through the geologic formation can be accounted for by variation of the lumped parameter $\Delta t/D'(\Delta z)^2$. Other methods can account for such properties in a single lumped parameter as well.

The computer program code listing below, written in MATLAB, illustrates an implementation of the finite difference approach for modeling subsurface pressures from atmospheric pressures. The finite difference solution of the diffusion equation for pressure is encapsulated within a search algorithm that "calibrates" the lumped parameter value within the model by finding the value of D' within a bounded range at which agreement between modeled subsurface pressures and measured subsurface pressures is maximized, as determined by minimization of the sum of squared differences between the modeled and measured pressures. This search ("calibration") algorithm (4006 in FIG. 4) is the subject of FIG. 6 described later. In computing the goodness of fit of modeled data to measured data, the specific embodiment in the code below disregards a period of time in which the influence of initial conditions on the dynamic state of the model is allowed to fade.

Figure 10:
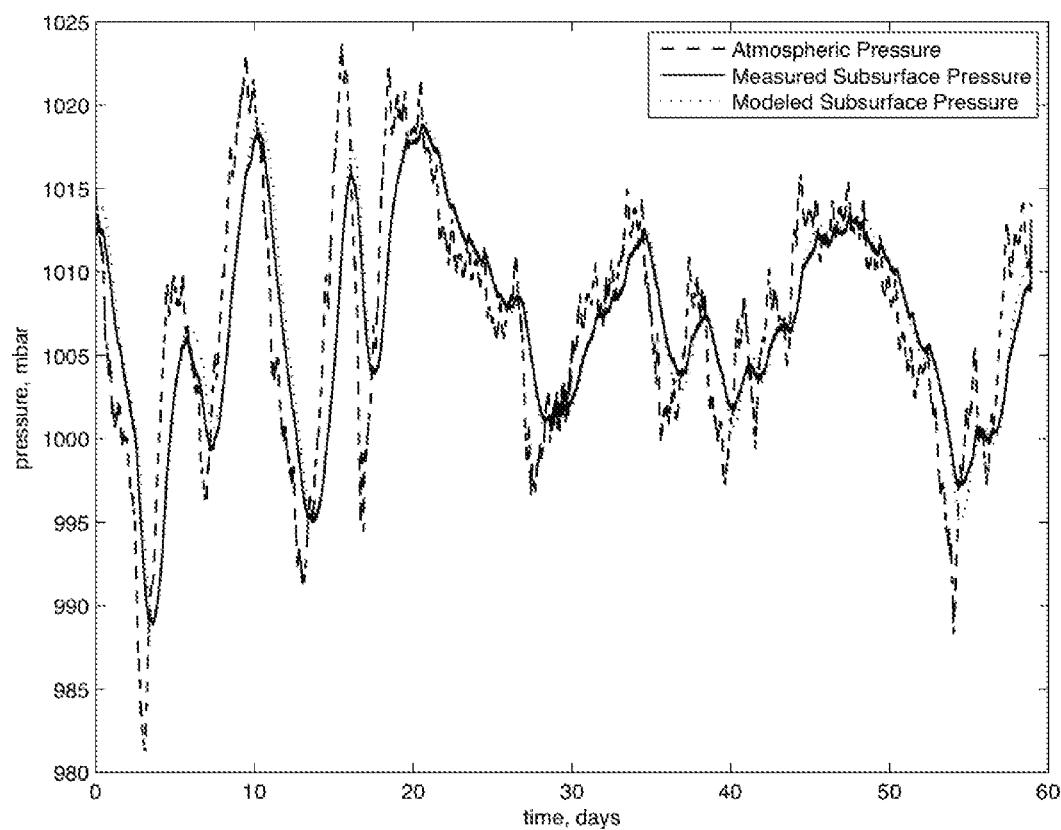
FIG. 10 is a graph demonstrating the effectiveness of a lumped parameter model in the form of a first-order recursive exponential filter in modeling the subsurface pressure signal from the surface pressure signal.

FIG. 10 is a graph demonstrating the effectiveness of a lumped parameter model in the form of a finite difference solution of the diffusion equation for modeling the subsurface pressure signal from the surface pressure signal.

```
%%
% This program contains and calibrates a numerical simulation of the
% one-dimensional dispersion equation for pressure through a porous
% medium. It is 1st order central difference in space and 1st order
% upwind differenced in time.
%
% The upper boundary condition is handled by setting the pressure to
% measured atmospheric pressure.
%
% The lower boundary condition is handled by applying an upwind
% difference rather than a central difference to compute the 2nd
% derivative with respect to space.
%
% Spatial and temporal resolution have been normalized by combining terms
% and lumping with the diffusivity term, so that for a constant only one
% parameter needs
%
%% The MATLAB workspace must include the following pre-loaded arrays
% P_atm is recent time history of measured atmospheric pressure
% P_act is recent time history of measured subsurface pressure at depth
%
%% Global constants
% TIME EQUIVALENTS IN SECONDS
DAY=84600; % one day in seconds
HOUR=3600; % one hour in seconds
MINUTE=60; % one minute in seconds
% NUMERICAL STABILITY CRITERIA FOR "COURANT" NUMBER OF SORTS
STABLE=0.5;
%% Data pre-processing
% Oversample P_atm and P_act from 15-minute data to 15-second data
% to provide a time step small enough for numerical stability over a
% reasonable range of geologic material permeabilities
```

```
P_atm15 = interpft(P_atm,60*size(P_atm,1),1);
P_act15 = interpft(P_act,60*size(P_act,1),1);
%% Model domain parameters
dt=15; % 15-second time sampling interval
dz=0.25; % spatial resolution in z direction, meters
max_z=9; % maximum depth of interest, meters
deeper=1; % number of nodes from point of interest to bottom of domain
total_z=max_z+dz*deeper; % total depth to bottom of domain
% Make time the primary dimension of a 2-D array and step through depth,
% filling in the array with new values at depth as we go
depths=dz:dz:total_z; %include grid point above z=0 for cent. diff
times=(1:length(P_atm15))*dt; %time step vector in seconds
%% Calibration (optimization) algorithm parameters
delay=500*60; %number of records to ignore when computing rms difference
resolution=0.001; %threshold for resolving optimal diffusion rate
% Initial values for calibration algorithm
a=resolution % set minimum parameter value to just above zero
b=STABLE-resolution % set maximum parameter value to just below stable limit
w=b-a % width of initial interval of coefficients to be evaluate
c=(a+b)/2 % midpoint of initial interval of coefficients to evaluate
%% Run model with at coefficient=c and evaluate fit to measurements
% set initial conditions throughout model domain
% all nodes initially at long term average barometric pressure
Pzt=ones(size(times,2),size(depths+2,2))*P00; %column=depth, row=timestep
% set all nodes to atmospheric pressure for first time step
Pzt(1,:)=P_atm15(1)*100;
% set boundary condition at ground surface
% ground surface pressure equals measured atmospheric pressure
Pzt(:,1)=P_atm15(1:length(times))*100; %pressure in Pascal at depth=-1*del_z
% run the model
for time=1:size(times,2)-1
    Pzt(time+1,2:end-1)=Pzt(time,2:end-1)+c*(Pzt(time,3:end)-2*Pzt(time,2:end-1)+Pzt(time,1:end-2));
    Pzt(time+1,end)=Pzt(time,end)+c*(Pzt(time,end)-2*Pzt(time,end-1)+Pzt(time,end-2));
end
% evaluate deviation between model and observation
rmsDiffAtMidpoint=sum((Pzt(delay:end,end-deeper)/100-P_act15(delay:end)).^2);
% initialize array of coefficients tried and deviation from measurements
pairs=[c rmsDiffAtMidpoint];
%% begin optimization loop to calibrate model
halfResolution=resolution/2;
while ( w > halfResolution )
    %% update optimization variables
    w=w/2
    a=c-w
    b=c+w
    %% Run model with at coefficient=a and evaluate fit to measurements
    % set initial conditions throughout model domain
    % all nodes initially at long term average barometric pressure
    Pzt=ones(size(times,2),size(depths+2,2))*P00; %column=depth, row=timestep
    % set all nodes to atmospheric pressure for first time step
    Pzt(1,:)=P_atm15(1)*100;
    % set boundary condition at ground surface
    % ground surface pressure equals measured atmospheric pressure
    Pzt(:,1)=P_atm15(1:length(times))*100; %pressure in Pascal at depth=-1*del_z
    % run the model
    for time=1:size(times,2)-1
        Pzt(time+1,2:end-1)=Pzt(time,2:end-1)+a*(Pzt(time,3:end)-2*Pzt(time,2:end-1)+Pzt(time,1:end-2));
        Pzt(time+1,end)=Pzt(time,end)+a*(Pzt(time,end)-2*Pzt(time,end-1)+Pzt(time,end-2));
    end
    % evaluate deviation between model and observation
    rmsDiffAtMin=sum((Pzt(delay:end,end-deeper)/100-P_act15(delay:end)).^2);
    %% Run model with at coefficient=b and evaluate fit to measurements
    % set initial conditions throughout model domain
    % all nodes initially at long term average barometric pressure
    Pzt=ones(size(times,2),size(depths+2,2))*P00; %column=depth, row=timestep
    % set all nodes to atmospheric pressure for first time step
    Pzt(1,:)=P_atm15(1)*100;
    % set boundary condition at ground surface
    % ground surface pressure equals measured atmospheric pressure
    Pzt(:,1)=P_atm15(1:length(times))*100; %pressure in Pascal at depth=-1*del_z
    % run the model
    for time=1:size(times,2)-1
        Pzt(time+1,2:end-1)=Pzt(time,2:end-1)+b*(Pzt(time,3:end)-2*Pzt(time,2:end-1)+Pzt(time,1:end-2));
        Pzt(time+1,end)=Pzt(time,end)+b*(Pzt(time,end)-2*Pzt(time,end-1)+Pzt(time,end-2));
    end
    % evaluate deviation between model and observation
```

```
rmsDiffAtMax=sum((Pzt(delay:end,end-deeper)/100-P_act15(delay:end)).^2);
if(rmsDiffAtMin<rmsDiffAtMidpoint)
    c=a % move midpoint of interval to previous minimum
    rmsDiffAtMidpoint=rmsDiffAtMin; % save deviation at new midpoint
elseif (rmsDiffAtMax<rmsDiffAtMidpoint)
    c=b % move midpoint of interval to previous maximum
    rmsDiffAtMidpoint=rmsDiffAtMax; % save deviation at new midpoint
end
% add to array of coefficients tried and deviations computed
pairs=vertcat(pairs, [c rmsDiffAtMidpoint]);
end
%%
% Physical properties
D=c*(dz^2)/dt % final pneumatic diffusivity of calibrated model
P00=mean(mean(Pzt)) % long-term mean pressure, Pascal
viscosity=1.837e-5 %dynamic viscosity of air, kg/m-s (Pa s), at 20C
porosity=0.2 % assumed porosity of medium
permeability=D*viscosity*porosity/P00; % final permeability, m^2
permeability=permeability/(100^2) % final permeability in cm^2
%-------------------------
% Typical Values of k in cm^2 include:
%   sand: 1e-5 to 1e-8
%   silt: 1e-9 to 1e-11
%   peat: 1e-7 to 1e-8
%   clay: 1e-9 to 1e-15
%   fresh sandstone: 1e-10 to 1e-11
%   fresh limestone: 1e-12 to 1e-13
%-------------------------
%%% display and plot results
% stackedLinePlot(Pzt/100,4,-4,'b-');
dayscale=[1:size(P_atm15,1)]/(24*4*60); %day of 15-second data
% plot the measured and modeled pressures
figure(4), hold off; clf;
plot(dayscale,P_atm15,'g-'); hold all;
plot(dayscale,P_act15,'b-');
plot(dayscale,Pzt(:,end-deeper)/100,'r-');
axis([0 60 980 1025]);
xlabel('time, days');
ylabel('pressure, mbar');
% plot coefficient search history
figure(5), hold off; clf;
plot(pairs(:,1));
% plot final square residuals
figure(6), hold off; clf;
plot(dayscale,(P_act15-Pzt(:,end-deeper)/100).^2); hold all;
plot(dayscale,(P_atm15-Pzt(:,end-deeper)/100).^2);
axis([0 60 0 100]);
xlabel('time, days');
ylabel('model deviation, square mbar');
```

Another method of modeling the subsurface air pressures via a lumped parameter model is to treat the attenuating influence of the geologic medium as a lowpass filter. If surface air pressures are measured at regular periodic intervals, then the pressure signal at depth can be simply modeled by a discrete-time digital filter. The simplest discrete-time lowpass digital filter is a recursive linear time invariant (LTI) exponential filter given by a difference equation which, in our application, takes the atmospheric pressure as input and produces an approximation of the pressure at depth as output.

$$P_{y,i} = f_y P_{0,i-1} + (1-f_y) P_{y,i}$$

in which:
P is pressure,
f is a filter coefficient between 0 and 1,
y is a subscript indicating the depth at which pressure is modeled and to which the filter coefficient applies, and
i is a subscript indicating the number of the current time interval of measurement and modeling.

In this modeling approach, the filter coefficient f is the lumped parameter that intrinsically accounts for physical variables such as the viscosity of air, the permeability and porosity of the geologic formation, as well as for the spatio-temporal relationship between grid spacing and time step in the equivalent finite difference formulation of the diffusion equation.

Figure 11:
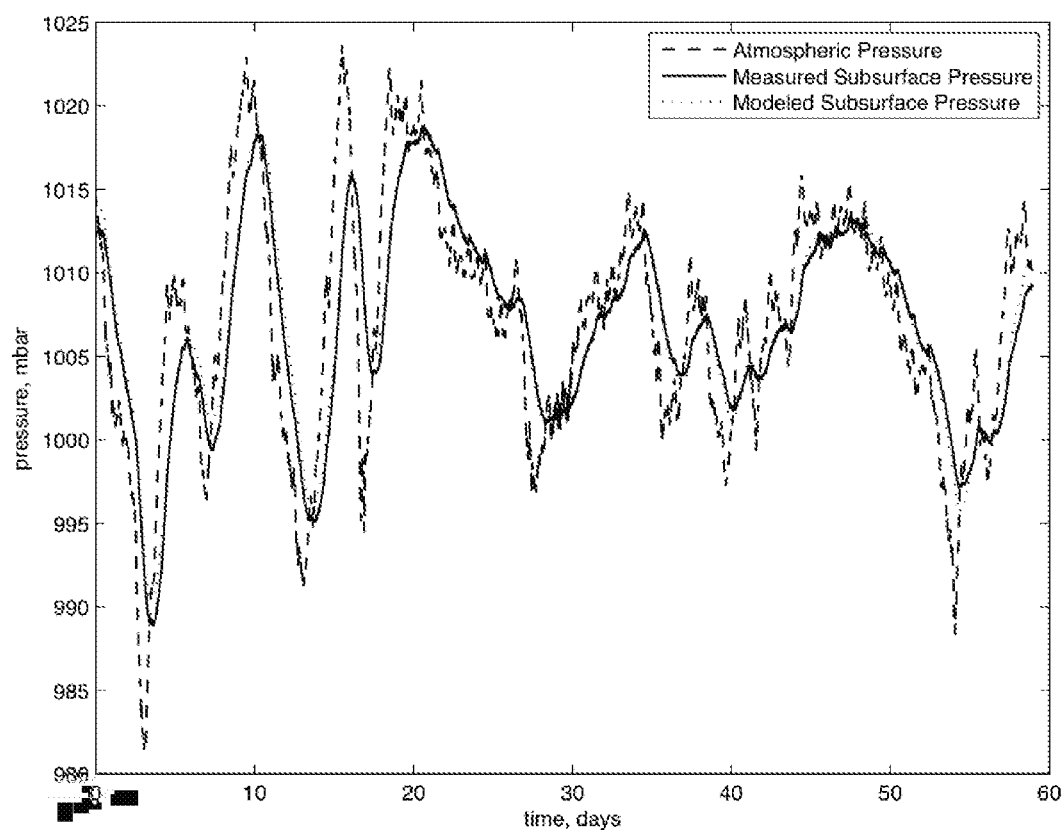
FIG. 11 is a graph demonstrating the effectiveness of a lumped parameter model in the form of a one-dimensional finite difference model of the diffusion equation in modeling the subsurface pressure signal from the surface pressure signal.

The computer program code listing below, written in MATLAB illustrates an implementation of the LTI filter approach to modeling subsurface pressures from atmospheric pressures. The LTI filter based model of subsurface pressures is an input to the algorithm described in the flowchart of FIG. 6 that "calibrates" the model by finding the value of the lumped parameter, e.g., filter coefficient f, between 0 and 1 at which disagreement between modeled subsurface pressures and measured subsurface pressures, defined as the sum of squared differences between the modeled and measured pressures, is minimized. In the specific embodiment of this procedure represented by the code below, quantification of the disagreement disregards a period of time during which the influence of initial conditions on the dynamic model is allowed to fade. FIG. 11 is a graph demonstrating the effectiveness of a lumped parameter model in the form of a recursive LTI exponential filter for modeling the subsurface pressure signal from the surface pressure signal.

```
%%
% This contains and calibrated a low-pass filter based model of dynamic
% pore pressure in subsurface geologic materials at a depth resulting
% from the effect that the medium exerts on fluctuations in atmospheric
% pressure as they are transmitted into the earth through the connected
% pore space of the geologic medium.
%
% This effect is modeled as a 1st order linear time invariant
% exponential filter acting on atmospheric pressure.
%
%% The MATLAB workspace must include the following pre-loaded
arrays
% P_atm is recent time history of measured atmospheric pressure
% P_act is recent time history of measured subsurface pressure at depth
resolution=0.00001; %threshold for resolving optimal filter coefficient
delay=100; %set number of time intervals for filter to settle initially
%% initialize variables for optimization of filter coefficient
a=0.0; % minimum possible filter coefficient
b=1.0; % maximum possible filter coefficient
w=b-a; % width of initial interval of coefficients to be evaluate
c=(a+b)/2; % midpoint of initial interval of coefficients to evaluate
%% run model with at coefficient=c and evaluate fit to measurements
P_model=expfilt(P_atm,c); %modeled pressure at depth
% evaluate deviation between model and observation
delay=min(100,round(10*(1-a)/a)); %set filter warmup time
rmsDiffAtMidpoint=sum((P_model(delay+1:end)-P_act(delay+1:end)).
^2);
% initialize array of coefficients tried and rms difference
pairs=[c rmsDiffAtMidpoint];
%% begin optimization loop to calibrate model
halfResolution=resolution/2;
while ( w > halfResolution )
   %% update optimization variables
   w=w/2;
   a=c-w;
   b=c+w;
   %% run model with at coefficient=a and evaluate fit to measurements
   P_model=expfilt(P_atm,a); %modeled pressure at depth
   % evaluate deviation between model and observation
   delay=min(100,round(10*(1-a)/a)); %set filter warmup time
   rmsDiffAtMin=sum((P_model(delay+1:end)-P_act(delay+1:end)).^2);
   %% run model with at coefficient=b and evaluate fit to measurements
   P_model=expfilt(P_atm,b); %modeled pressure at depth
   % evaluate deviation between model and observation
   delay=min(100,round(10*(1-b)/b)); %set filter warmup time
   rmsDiffAtMax=sum((P_model(delay+1:end)-P_act(delay+1:end)).^2);
   if(rmsDiffAtMin<rmsDiffAtMidpoint)
      c=a; % move midpoint of interval to previous minimum
      rmsDiffAtMidpoint=rmsDiffAtMin; % save deviation at new
         midpoint
   elseif (rmsDiffAtMax<rmsDiffAtMidpoint)
      c=b; % move midpoint of interval to previous maximum
      rmsDiffAtMidpoint=rmsDiffAtMax; % save deviation at new
         midpoint
   end
   % add to array of coefficients tried
   pairs=vertcat(pairs, [c rmsDiffAtMidpoint]);
end
%% display and plot results
coeff % final optimal filter coefficient
dayscale=[1:size(P_atm,1)]/(24*4); %day of 15-minute data
% plot the measured and modeled pressures
figure(1), hold off; clf;
plot(dayscale,P_atm,'g'); hold all;
plot(dayscale,P_act,'b');
plot(dayscale,P_model,'r'); hold off;
axis([0 60 980 1025]);
xlabel('time, days');
ylabel('pressure, mbar');
% plot coefficient search history
figure(2), hold off; clf;
plot(pairs(:,1));
% plot final square residuals
figure(3), hold off; clf;
plot(dayscale,(P_act-P_model).^2); hold all;
plot(dayscale,(P_act-P_atm).^2); hold off;
axis([0 60 0 100]);
xlabel('time, days');
ylabel('model deviation, square mbar');
```

Figure 7:
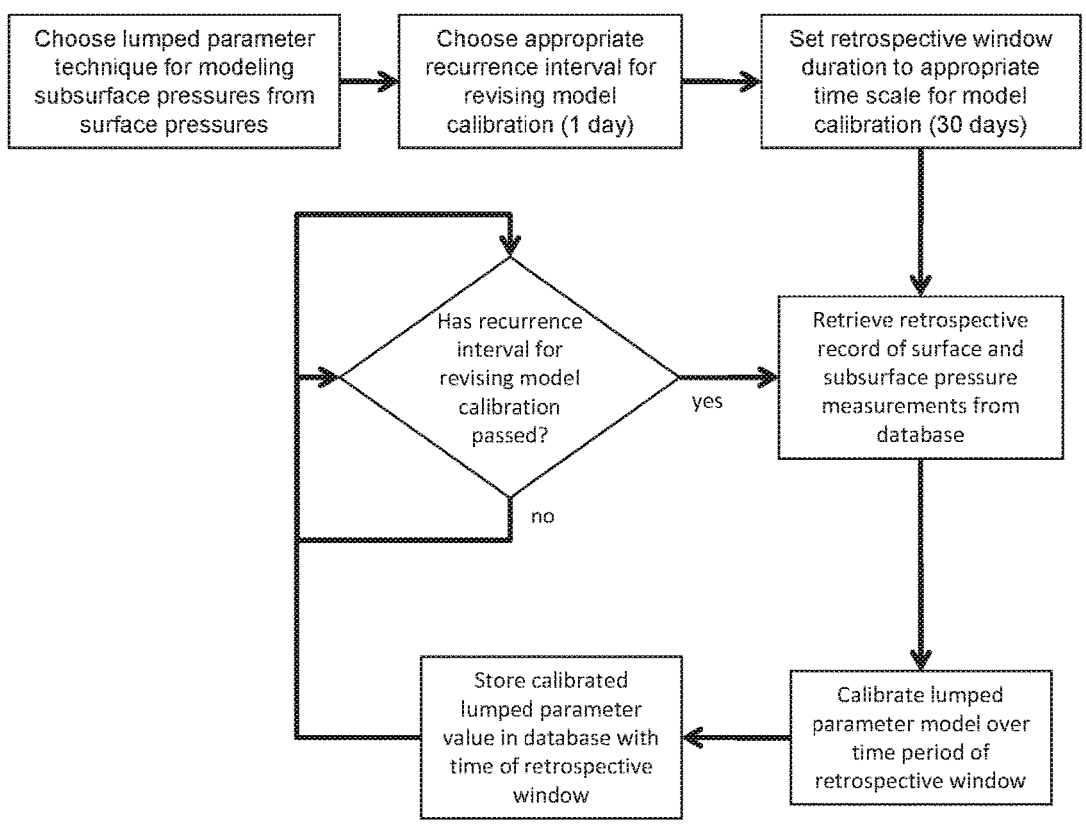
FIG. 7 is a flowchart describing a procedure for generating an up-to-date time series of calibrated lumped parameter values by continually recalibrating a lumped parameter model to make its output consistent with recently measured data.
Figure 8:
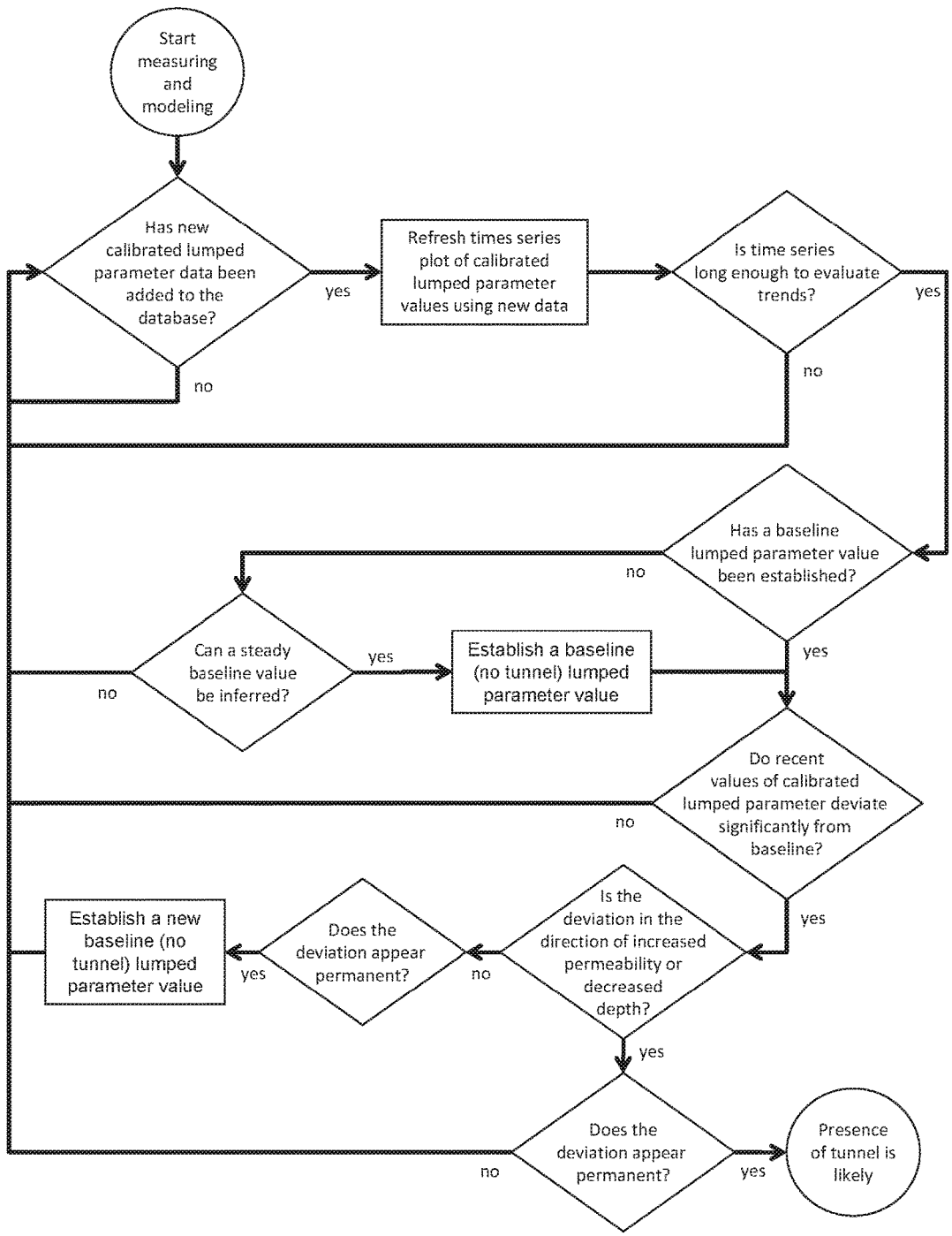
FIG. 8 is a flowchart describing a process for detecting the introduction of a tunnel from a repeatedly updated time series of calibrated lumped parameter values at a given monitoring location.

An example method of detecting a tunnel (4008 in FIG. 4) is described in the flowchart of FIG. 8. This method requires a time series of calibrated lumped parameter values which may be produced by the procedure described in the flowchart of FIG. 7, which recalibrates the lumped parameter value on a regular and ongoing basis, for instance daily, using a calibration procedure like that described in the flowchart of FIG. 6. The process described in the flowchart of FIG. 8 detects the introduction of a tunnel by identifying a significant shift over time in the calibrated value of the lumped model parameter. Each calibrated lumped parameter value in the time series produced by the procedure described in the flowchart of FIG. 7 is produced by recalibrating the lumped parameter against a recent history of observed measurements of subsurface pressures, for instance the previous ten, twenty, or thirty days, referred to as a retrospective window of data.

If the recursive LTI exponential filter is the model selected to model subsurface pressures as a function of surface pressures, then a tunnel will be indicated by an increase over time in the average calibrated value of the filter coefficient f. If, alternatively, a finite difference model is used, than the introduction of a tunnel will be indicated by an increase over time in the calibrated value of the lumped parameter $\Delta t/D'$ $(\Delta z)^2$. A practitioner of ordinary skill in the art will recognize that an increase in this parameter is equivalent to either a decrease in the apparent node spacing of the model, indicating an increase in proximity to the boundary at which atmospheric forcing occurs, such as a tunnel interior, or is equivalent to an increase in the permeability of the formation, which the removal of the impermeable fraction of the soil matrix due to construction of a tunnel is equivalent to, analogous to the creation of a large fracture or what is also commonly known as secondary porosity.

Figure 12:
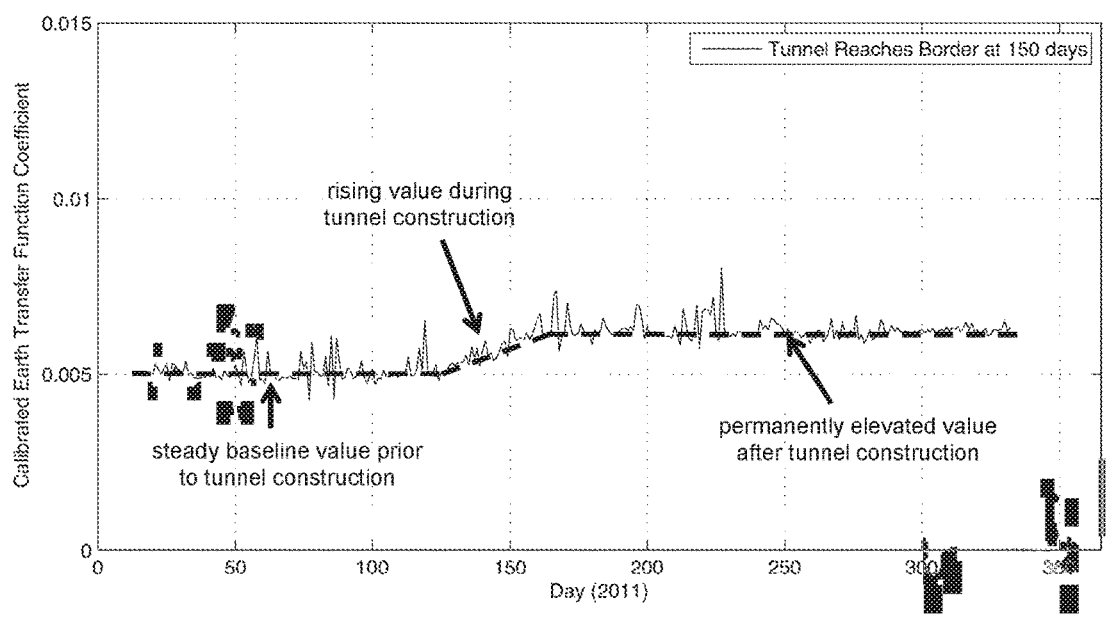
FIG. 12 is a plot of a time series of a calibrated lumped model parameter as may be produced using the procedure described in the flowchart of FIG. 5.

The introduction of a tunnel can also be inferred from the use of any other lumped parameter model of the propagation of atmospheric pressure variations into a geologic formation in which the lumped parameter accounts for geologic formation permeability or the distance from the forcing boundary condition, or both. FIG. 12 is a plot of a time series of a calibrated lumped model parameter as would be produced using the procedure described in the flowchart of FIG. 7. The model used to produce FIG. 12 was a recursive LTI exponential filter, but other models may also be used.

Figure 6:
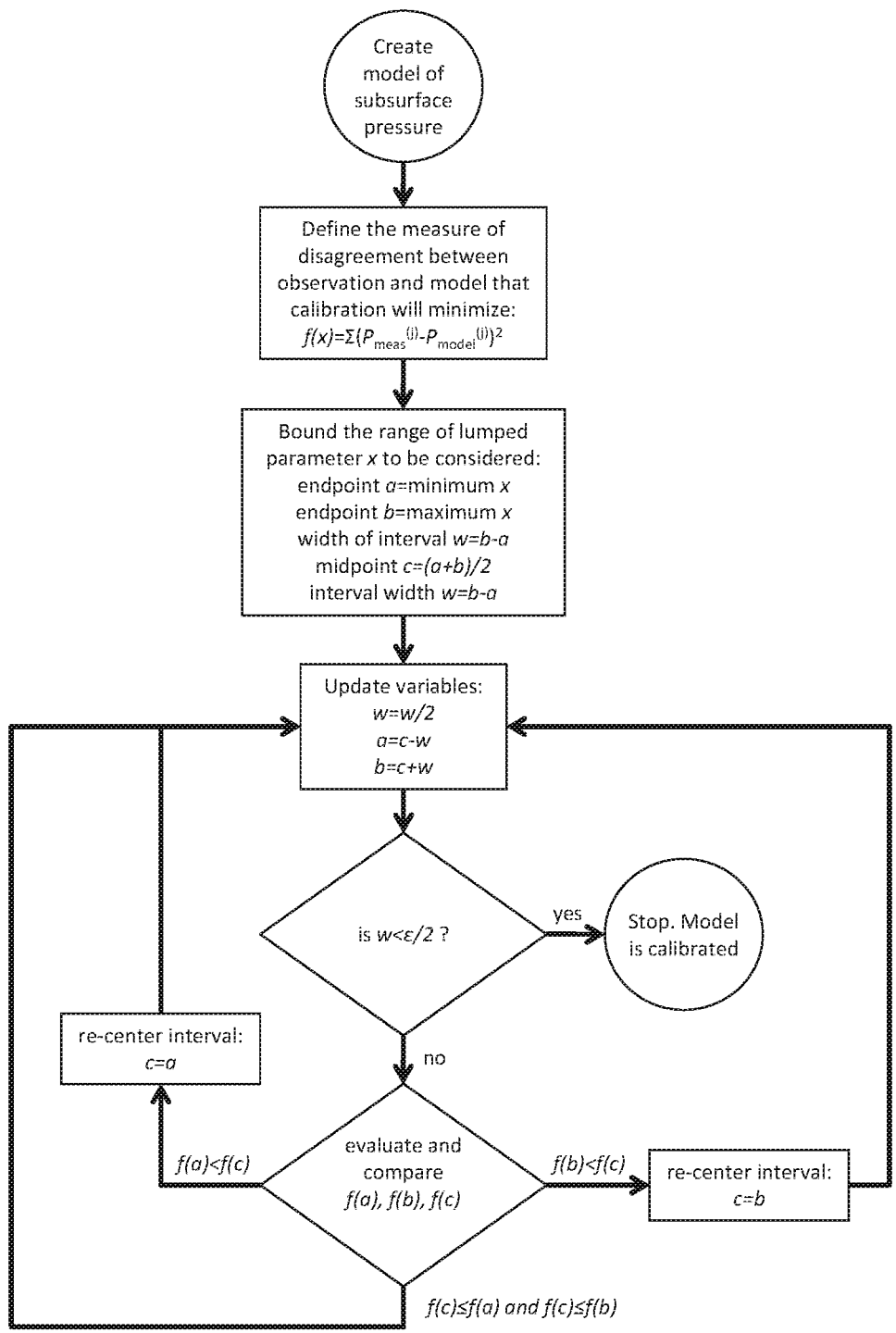
FIG. 6 is a flowchart describing a procedure for calibrating a lumped parameter model to optimize agreement between its output and a record of measured data.

Each time recalibration of the lumped parameter value described in FIG. 7 is performed, it may be performed according to the model calibration procedure described in the flowchart of FIG. 6. The model calibration algorithm described in FIG. 6 is a general algorithm for finding the value of a variable, within a predefined interval, at which a given function of that variable is minimized. In the presently described embodiment, the one variable is the lumped parameter input of a lumped parameter model of subsurface pressures and the function of that variable is the sum of squared differences between modeled and measured subsurface pressures over the period of record for which the model is calibrated.

The calibration procedure utilizes as input recently acquired time series of surface and subsurface pressure measurements that may be acquired by the process described in the flowchart of FIG. 3. In addition to the function and input data just identified, the algorithm described in FIG. 6 may also require as input the maximum and minimum value of the range of input variable over which to search for the minimum function value and a tolerance parameter, e, that represents the precision to which the algorithm will find the value of the input variable corresponding to the minimum function value over the range examined. The algorithm may evaluate the function at a set of three values of the input variable corresponding to ¼, ½, and ¾ of the search range specified and identify which of the three values of the input variable produces the lowest value of the function.

The algorithm may then create a new set of three equally spaced values of the input variable at which to evaluate the function. The middle one of the three new values of the input variable, the midpoint of the range, is that value of the input variable that previously produced the minimum function value, and the new maximum and minimum values of the input variable are set to produce a range that is equal to one-half the range previously evaluated. The function is then evaluated at the new minimum and maximum of the new range of the input variable and compared with the function value previously computed for what is now the midpoint of the range input variable, to determine which of these three values of the input variable produces the minimum function value.

The two steps of defining a new set of three values of the input variable over half the previous range and finding which of the three produces the minimum function value is repeated until the range is less than twice the tolerance parameter (the half-range is less than the tolerance value) that represents the precision to which the algorithm will find the value of the input variable corresponding to the minimum function value over the range examined. The final value of the input variable representing a parameter of the numerical model is then the calibrated value of that parameter. If the model is a first-order exponential LTI filter, then the model parameter is the filter constant $f$ described above. If the model is a one-dimensional finite difference approximation of the diffusion equation, then the model parameter is the grid-normalized diffusion coefficient $\Delta t/D'(\Delta z)^2$.

The procedures depicted in the flowcharts of FIG. 6 and FIG. 7 are implemented in the following MATLAB code listing using a recursive LTI filter model of subsurface pressures and a retrospective data window of 30 days.

```
% This is a numerical simulation of the low-pass filtering effect that
% porous geologic materials exert on fluctuations in atmospheric pressure
% as they are transmitted into the earth through the connected pore space
% of the geologic medium.
%
% This effect is modeled as a 1st order linear time invariant exponential
% filter, also called an 'LTI' exponential filter
% This code calibrates the filter against a moving window of measured data
% to show whether or not the calibrated filter coefficient is changing
% over time, which may indicate the presence of a tunnel
%
%% Workspace must include the following pre-loaded arrays
% P_atm is recent time history of measured atmospheric pressure
% P_act is recent time history of measured subsurface pressure at depth
% clear all;
% the variables in the following workspace are created by running SimASOStunnel.m
% load('/Volumes/transcendev1/Documents/Tunnel
Detection/Modeling_Analysis/Matlab/SanDiegoTunnelSim.mat')
numSamples=size(P_atm,1); %number of samples in measurement record
%% global static constants
SAMPLE_RATE=15; %sample rate of measurements in minutes
ONE_DAY=24*60/SAMPLE_RATE; %length of a day in samples
%% calibrate the model
% initialize figure and workspace
figure(7); hold off; clf;
% Calibration window parameters
windowDays=[40]; % size of calibration window in days
windowSizes=windowDays*ONE_DAY; %size of calibration window in samples
% calibrate against simulated conditions with tunnel
for P_act=P_tun
    %try the algorithm using each retrospective window size specified
    for windowSize=windowSizes
        windowStart=1;
        windowEnd=windowStart+windowSize-1;
        % initialize array of window end dates and corresponding calibrated coefficients
        calCoef=[ ];
        while windowEnd<numSamples
            history=[ ];
            %% initialize variables for optimization of filter coefficient
            resolution=0.00001; %threshold for resolving optimal filter coefficient
            a=0.0; % minimum possible filter coefficient
            b=1.0; % maximum possible filter coefficient
            w=(b-a)/2; % width of initial interval of coefficients to be evaluate
            c=(a+b)/2; % midpoint of initial interval of coefficients to evaluate
            %% run model with coefficient=c and evaluate fit to measurements
            P_model=expfilt(P_atm(windowStart:windowEnd,1),c); %modeled pressure at depth
            % evaluate deviation between model and observation
            rmsDiffAtMidpoint=sum((P_model(1:end)-P_act(windowStart:windowEnd,1)).^2);
            %% begin optimization loop to calibrate model
            halfResolution=resolution/2;
            while ( w > halfResolution )
                %% update optimization variables
                w=w/2.0;
                a=c-w;
                b=c+w;
                if (a<=0.0)||(b>=1.0)
```

```
        pause;
    end
    %%% run model with coefficient=a and evaluate fit to measurements
    P_model=expfilt(P_atm(windowStart:windowEnd,1),a); %modeled pressure at depth
    % evaluate deviation between model and observation
    rmsDiffAtMin=sum((P_model(1:end)-P_act(windowStart:windowEnd,1)).^2);
    %%% run model with at coefficient=b and evaluate fit to measurements
    P_model=expfilt(P_atm(windowStart:windowEnd,1),b); %modeled pressure at depth
    % evaluate deviation between model and observation
    rmsDiffAtMax=sum((P_model(1:end)-P_act(windowStart:windowEnd,1)).^2);
    % add to array of coefficients tried
    history=[history; [a c b rmsDiffAtMin rmsDiffAtMidpoint rmsDiffAtMax]];
    if(rmsDiffAtMin<rmsDiffAtMidpoint)
        c=a; % move midpoint of interval to previous minimum
        rmsDiffAtMidpoint=rmsDiffAtMin; % save deviation at new midpoint
    elseif (rmsDiffAtMax<rmsDiffAtMidpoint)
        c=b; % move midpoint of interval to previous maximum
        rmsDiffAtMidpoint=rmsDiffAtMax; % save deviation at new midpoint
    end
  end
  % add calibrated coefficient to array of dates and results
  % (date is center of calibration window, not start or end)
  calCoef=[calCoef; [(windowStart+windowEnd)/(2*ONE_DAY) c]];
  windowStart=windowStart+ONE_DAY; %move window start to a day later
  windowEnd=windowStart+windowSize-1; %move window end to a day later
 end
 %%%
 % plot calibration coefficient versus time at center of cal window
 figure(7), plot(calCoef(:,1),calCoef(:,2),'k-'); hold all;
  end
end
figure(7), legend('Tunnel Reaches Border at 150 days');
axis([0 365 0 0.015]);
grid on;
xlabel('Day (2011)');
ylabel('Calibrated Earth Transfer Function Coefficient');
```

The above program code, a specific embodiment of the procedure described in the flowcharts of FIG. 6 and FIG. 7, produces a plot like that shown in FIG. 12, which shows the calibrated lumped model parameter as a function of time. FIG. 12 shows the result of applying the procedure described in the flowcharts of FIG. 6 and FIG. 7 to a data set that simulates a tunnel being constructed in the general direction of a subsurface pressure monitoring point that is 20 m below ground surface. Tunnel construction begins 100 m from the border on the 100th day of the simulation and progresses toward the border at a depth of 5 m. Tunnel construction advances at 2 m per day and reaches the border at a lateral distance of 15 m from the monitoring point on the 150th day of the simulation.

As the plot of FIG. 12 shows, the LTI filter coefficient representing the lumped diffusion parameters undergoes a permanent shift in average value as the tunnel crosses at its nearest distance from the monitoring point. The permanent shift in the average value of the transfer function coefficient indicates the introduction of a tunnel into the monitoring regime.

To detect a tunnel whose existence pre-dates installation of the subsurface pressure monitoring network, a unique calibrated model parameter for each monitoring location within the plurality of monitoring locations comprising the network may be computed from initial monitoring data, and then the spatial distribution of model parameters may be evaluated for spatial anomalies that may indicate the presence of a pre-existing tunnel. A practitioner of ordinary skill in the art will recognize, after reading this disclosure in its entirety, that spatial inference methods and geostatistical methods such as triangulation, trilateralization, kriging, geophysical inversion approaches, and/or other methods appropriate for estimating the location of a detected tunnel, may be used.

Figure 9:
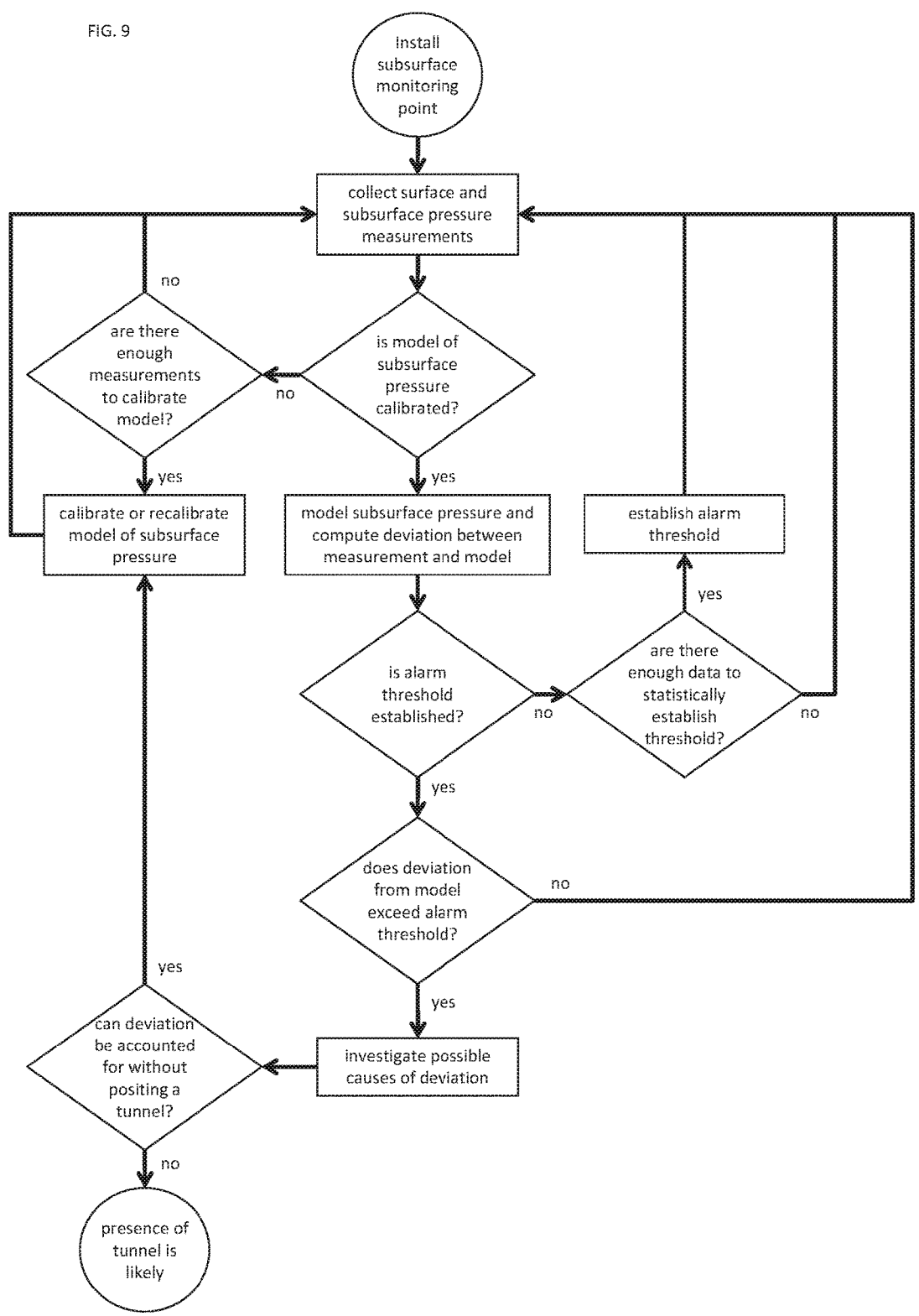
FIG. 9 is a flowchart describing a procedure to infer the introduction of a tunnel from a decrease in agreement between measured data and the output of a once calibrated lumped parameter model.

Another procedure for detecting the presence of a tunnel based on measurements of surface and subsurface pressures is described in the flowchart of FIG. 9. Pressure sensors are installed at the surface and at depth in a given location, and monitoring pressure at a regular sampling interval on the order of five to fifteen minutes. After monitoring for several days, sufficient data are available to calibrate a lumped parameter model of subsurface pressures that result from atmospheric pressure by the procedure described in the flowchart of FIG. 6. Following one-time model calibration, monitoring of both surface and subsurface pressures continues over time, as does modeling of the subsurface pressure using the once calibrated model with measured surface pressures as input.

A metric quantifying the deviation between modeled and measured subsurface pressures, such as the sum of square differences over a given time interval, may also be continually computed and compared to past values of the same metric. A reasonable threshold for this metric may be established by a statistical confidence limit computed from prior system data or by human judgment. For example, the threshold may be set at value that exceeds the mean value of the metric over the past thirty days by three times the standard deviation of the metric observed over the same time period. Below the chosen threshold, deviation between modeled and measured pressures may be considered normal and not indicative of the introduction of any new tunnels. However, if the metric quantifying the deviation between modeled and measured subsurface pressures exceeds the chosen threshold, it may indicate that subsurface physical conditions controlling the diffusion of surface atmospheric pressure deviations into the earth have changed, from which the presence of a new tunnel may be inferred.

Figure 13:
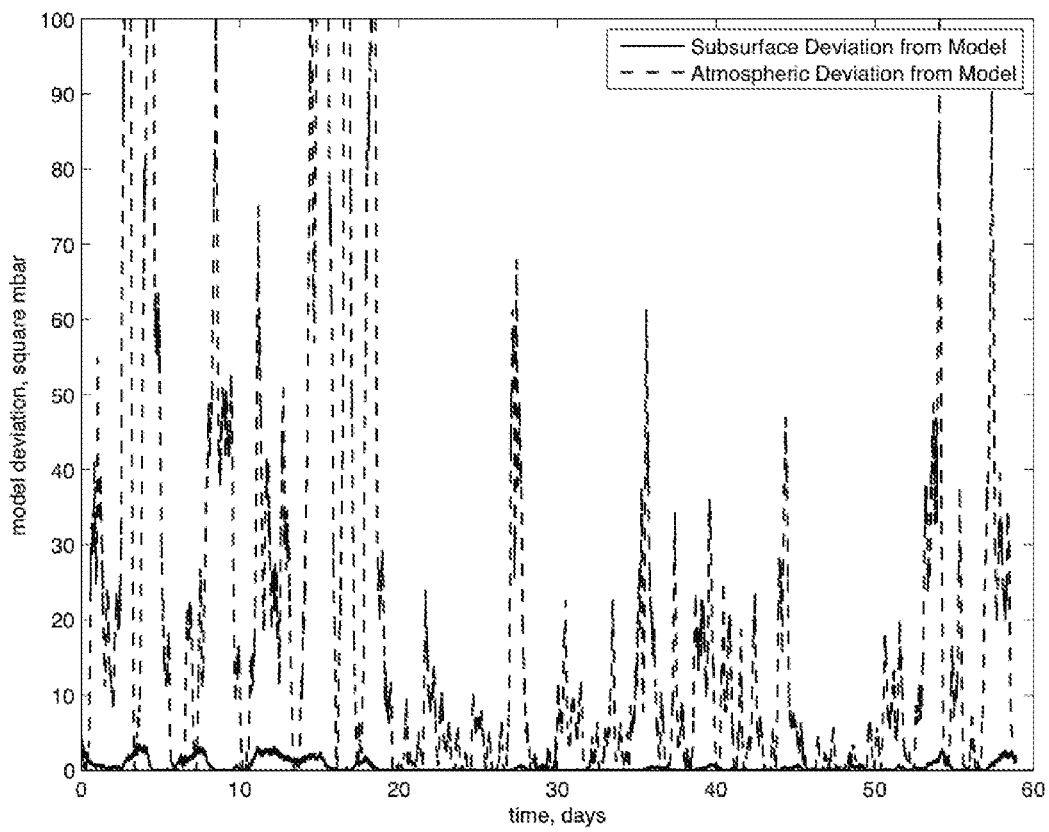
FIG. 13 is a graph showing a deviation between measured surface pressures and modeled subsurface pressures and a deviation between measured subsurface pressures and modeled subsurface pressures using a first-order recursive exponential filter to model of subsurface pressures.

FIG. 13 is a graph showing the deviation between measured surface pressures and modeled subsurface pressures and the deviation between measured subsurface pressures and modeled subsurface pressures using a recursive LTI exponential filter based model of subsurface pressures. A threshold can be established, above which this deviation would be considered indicative of a possible tunnel. For the situation shown in FIG. 13, a threshold of 5 mbar$^2$ would be appropriate because that is slightly above the maximum value of the deviation between modeled and measured subsurface pressures over the time period examined, but well within the deviation that would be seen if un-damped atmospheric pressure variations were transmitted to near the monitoring point by the presence of a tunnel.

Figure 14:
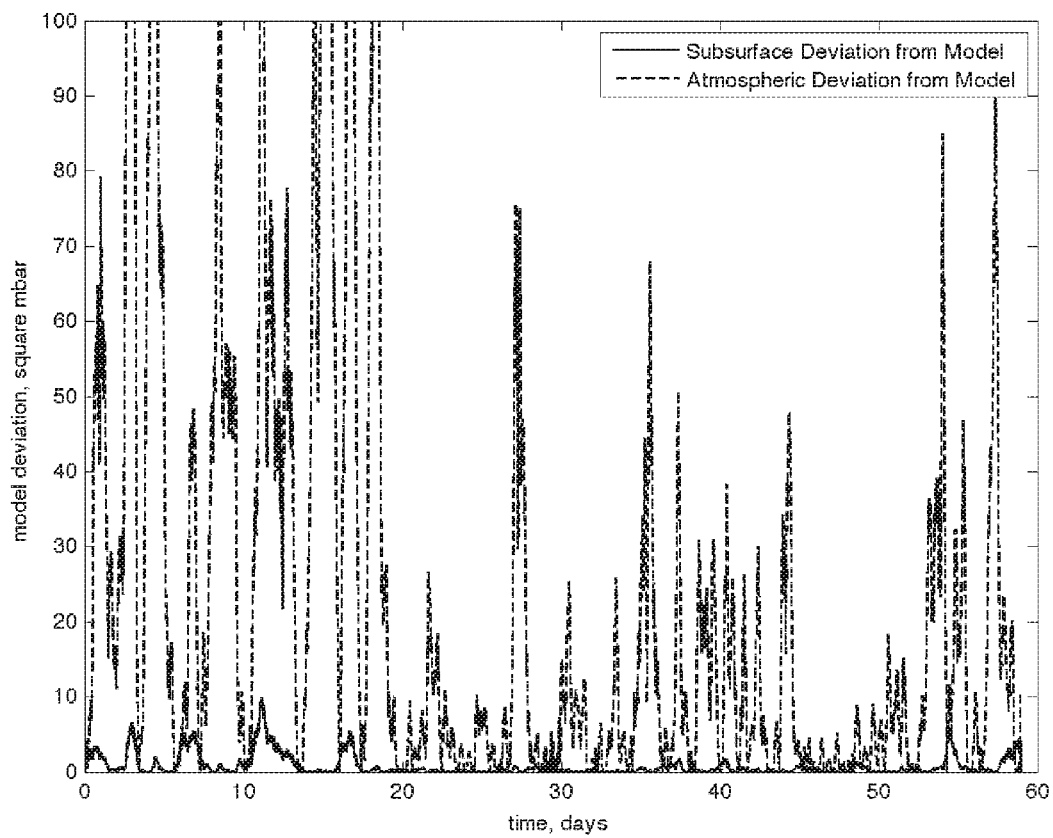
FIG. 14 is a graph showing a deviation between measured surface pressures and modeled subsurface pressures and a deviation between measured subsurface pressures and modeled subsurface pressures using a one-dimensional finite difference model of the diffusion equation to model subsurface pressures.

FIG. 14 is a graph showing the deviation between measured surface pressures and modeled subsurface pressures and the deviation between measured subsurface pressures and modeled subsurface pressures using a one-dimensional finite difference based model of subsurface pressures. A threshold can be established above which this deviation would be considered indicative of a possible tunnel.

For the situation shown in FIG. 14, a threshold of 15 mbar$^2$ would be appropriate because that is slightly above the maximum value of the deviation between modeled and measured subsurface pressures over the time period examined, but well within the deviation that would be seen if un-damped atmospheric pressure variations were transmitted to near the monitoring point by the presence of a tunnel.

Another useful procedure for detecting the presence of a tunnel based on measurements of surface and subsurface pressures is to perform a frequency domain characterization of the transfer function performed by the earth's porous materials on variations in atmospheric pressure in the absence of a tunnel at a specific location during a specific time period and to compare the results of the characterization to either frequency domain characterization of the transfer function at other nearby or geologically analogous locations during the same time period or to the frequency domain characterization of the transfer function at the same location during other time periods when a tunnel may be present. One useful way of implementing this frequency domain procedure is to convert the time domain measurements of pressure fluctuations above and below ground to frequency domain measurements using a Fast Fourier Transform (FFT), Discrete Fourier Transform (DFT), or other computational method and to characterize the earth's frequency dependent transfer function for pressure fluctuations as analogous to the S12 or S21 frequency-dependent scattering parameter known to those skilled in electrical engineering and more specifically those skilled in electrical signal transmission. Either a significant change in the transfer function (or scattering parameters) at the same location over time, or the presence of spatially anomalous transfer function at one subsurface pressure monitoring location relative to a plurality of other nearby subsurface pressure monitoring locations will indicate the possible presence of a subsurface tunnel proximal to the subsurface pressure monitoring location.

Another useful procedure for detecting the presence of a tunnel based on measurements of surface and subsurface gas pressures is to regard the effect of the earth's porous materials on transmission of variations in atmospheric pressure to depth as a convolution filter acting on the pressure fluctuations that occur above ground. In this approach, the convolution filter function representing the pressure transfer function of the earth's porous materials is estimated by performing a mathematical deconvolution of the time series measurement of the subsurface pressure signal with the corresponding time series measurement of the aboveground pressure signal. The deconvolution can be performed in the frequency domain, using the Fast Fourier Transform (FFT) or Discrete Fourier Transform (DFT), for example, to convert the time domain representations of the time series measured signals to frequency domain, or it can be performed in the time domain. Stability of the deconvolution can be ensured by applying a regularization method such as Tikhonov regularization, Maximum Entropy Regularization, Least Squares with Quadratic Constraint, singular value decomposition (SVD), Truncated SVD (TSVD) or Generalized SVD (GSVD). Other regularization methods can also be applied. In this procedure for detecting a tunnel based on spatial anomalies or temporal changes in the pressure transfer function of the earth's porous materials expressed as a convolution filter function, the tunnel is detected by observing a change over time in the convolution filter function, which represents the dynamic pressure transfer function of the earth's porous materials at a given location, either relative to a preceding time period in which a tunnel is known or presumed not to exist, or by observing a spatially anomalous convolution filter function at a given subsurface monitoring location relative to convolution filter functions determined for each of a plurality of other nearby subsurface pressure monitoring locations.

A critical new feature of aspects of the present disclosure is that such aspects use a physical principle and sensing modality not previously employed for tunnel detection: that of dynamic pressure transmission and attenuation through a multi-phase porous medium.

One advantage of aspects of the present disclosure is relative immunity to extraneous sources of noise. Seismic, acoustic, and electro-magnetic approaches to tunnel detection are all susceptible to the ambient signals interfering with the tunnel signature, which either reduces sensitivity or increases the likelihood of a false detection. Another advantage is that expensive transducers or electronic equipment do not need to be buried or inserted deep in the earth to acquire a signal from which the presence of a tunnel can be inferred. Seismic and acoustic based approaches require the signal transducer ideally to be placed far from noise (the ground surface) and close to the tunnel, therefore significantly below the ground surface. In contrast, the pressure signal required for aspects of the current disclosure can simply be ducted to an aboveground transducer using a pipe, tube, well-casing, or other competent pressure transmitting conduit placed in the ground. In other words, the transducer does not have to be located in the regime it is sensing.

A further advantage of aspects of the present disclosure is that the data acquisition rates required to detect a tunnel are much lower and require less communications bandwidth and storage (memory) than seismic and acoustic methods, which must resolve signals having a periodicity on the order of seconds to milliseconds, versus natural pressure variability whose periodicity is on the order of hours to days. A still further advantage of aspects of the present disclosure is that, due to the slower data rate and noise immunity previously mentioned, the data processing required is simpler and less computationally intensive than seismic and acoustic methods. Other advantages of aspects of the present disclosure accrue in the way of cost. Owing to the less intrusive installation method, simpler data acquisition and processing, and greater long-term stability of the transduction technology versus other tunnel detection devices and methods, both the initial cost and operational cost of aspects of the present disclosure can be advantageous.

In broad embodiment, aspects of the present disclosure provide a system for detecting the presence of subsurface tunnels by monitoring changes in the temporal pattern of atmospherically driven variations in subsurface soil gas pressure relative to atmospheric pressure. Although aspects of the disclosure are directed to exploiting relationships between readings of atmospheric pressures, one or more of various other naturally occurring phenomena may be monitored in combination with or independently from atmospheric pressures. For example, relationships between readings of temperatures, humidity, infrasound, cosmic rays, and/or other naturally occurring phenomena may be monitored and processed similarly to how atmospheric pressures are described as being processed in aspects of the present disclosure. A single phenomenon may be monitored or many may be monitored in combination.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
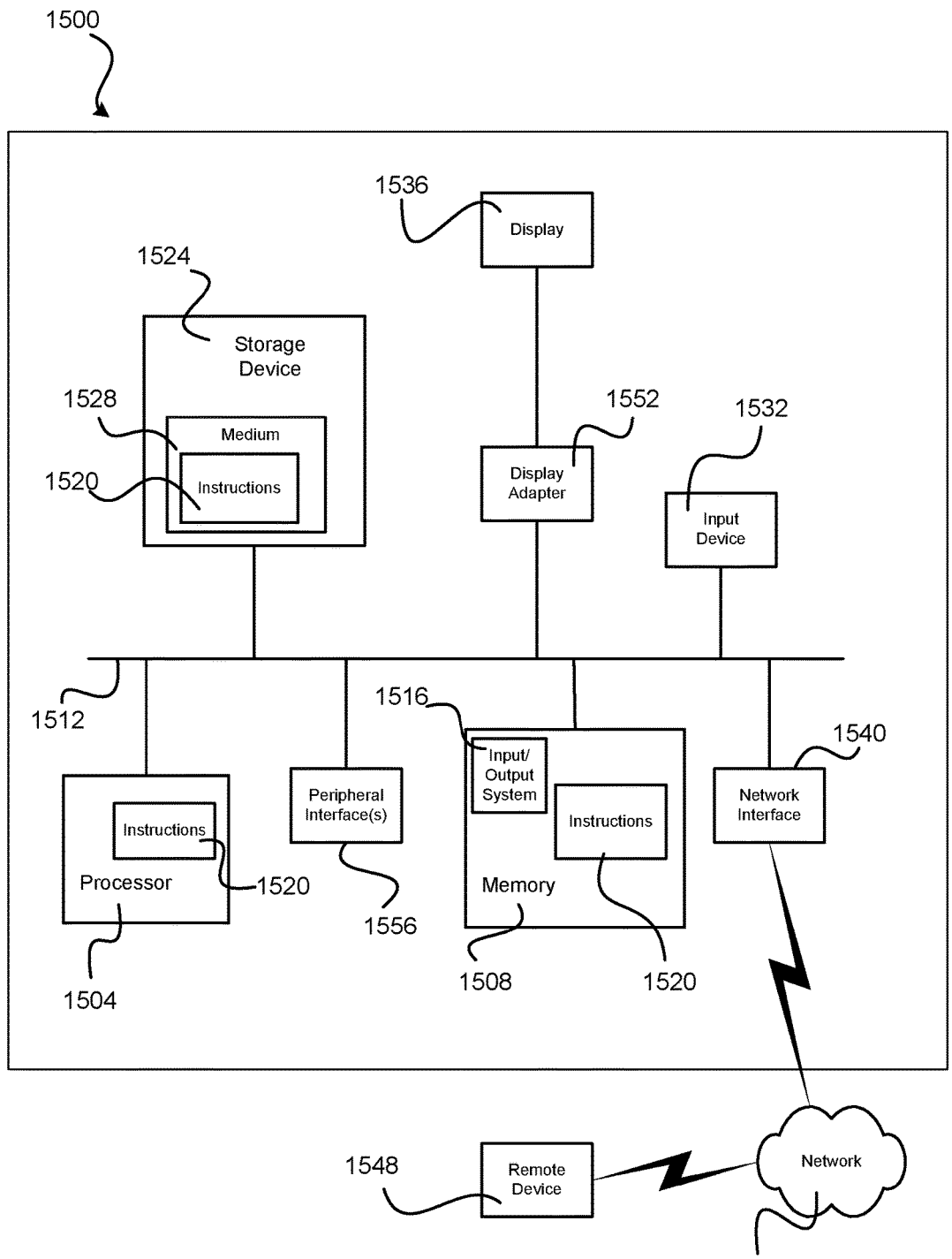
FIG. 15 is a block diagram of a computing system that can be used to implement any one or more of the methodologies disclosed herein and any one or more portions thereof.

FIG. 15 shows a diagrammatic representation of one embodiment of a computing device in the exemplary form of a computer system 1500 within which a set of instructions for causing a control system, such as any one or more of the systems described herein, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Memory 1508 may include various components (e.g., machine-readable media) including, but not limited to, a random access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of detecting subsurface tunnels, the method comprising:
    measuring air pressure continually in time with a first sensor positioned above or below ground to generate a first air pressure signal;
    measuring air pressure continually in time with a second sensor positioned at a depth relative to a surface of the earth and positioned at a greater depth below the surface of the earth than the first sensor to generate a second air pressure signal;
    generating a third air pressure signal using a numerical model that employs the first air pressure signal as input to produce an optimal approximation of the second air pressure signal, the accuracy of such approximation being optimized by systematic adjustment of model input parameters that represent the effects of the permeability of the earth and the depth of the second sensor on the difference of the second air pressure signal from the first air pressure signal; and
    detecting the introduction of a subsurface tunnel proximal to the second sensor based on a change in the accuracy with which the third air pressure signal approximates the second air pressure signal over subsequent time windows.

2. A method according to claim 1, wherein the numerical model includes a finite difference formulation of the partial differential equation known as the Diffusion equation.

3. A method according to claim 1, wherein the numerical model includes a digital low-pass filter.

4. A method according to claim 1, wherein the accuracy with which the third air pressure signal approximates the second air pressure signal is optimized repeatedly over multiple successive time windows and wherein detection of the introduction of a subsurface tunnel proximal to the second sensor is based on a change in the values of the model input parameters that are found to produce the optimal approximation of the second air pressure signal by the third air pressure signal.

5. A method according to claim 4, wherein the numerical model comprises a finite difference formulation of the partial differential equation known as the Diffusion equation.

6. A method according to claim 4, wherein the numerical model comprises a digital low-pass filter.

7. A method according to claim 1, wherein the signals measured, generated, and compared are represented in time domain.

8. A method according to claim 1, wherein the signals measured, generated, and compared are represented in frequency domain.

9. A method according to claim 1, wherein the numerical model includes a convolution filter that includes a deconvolution of the first air pressure signal with the second air pressure signal.

10. A method according to claim 4, wherein the numerical model includes a convolution filter that includes a deconvolution of the first air pressure signal with the second air pressure signal.

11. A method of detecting subsurface tunnels, the method comprising:
measuring air pressure continually in time with a first sensor positioned above ground to generate a first air pressure signal;
measuring air pressure continually in time from a plurality of subsurface sensors positioned at a depth relative to a surface of the earth and separated from each other by some horizontal distance to generate a plurality of measured subsurface air pressure signals;
generating a plurality of additional modeled air pressure signals using a numerical model that employs the first air pressure signal as input to produce an optimal approximation of each of the plurality of measured subsurface air pressure signals, the accuracy of each approximation being optimized by systematic adjustment of one or more model input parameters that represent the effects of the permeability of the earth and the depth at the position of the corresponding subsurface sensor on the difference of the corresponding subsurface air pressure signal from the first air pressure signal; and
detecting a tunnel existing proximal to one or more of the plurality of subsurface sensors based on spatially anomalous values of the model input parameters as adjusted to produce optimal approximation of each measured subsurface air pressure signal by the corresponding modeled air pressure signal.

12. A method according to claim 11, wherein the numerical model includes a finite difference formulation of the partial differential equation known as the Diffusion equation.

13. A method according to claim 11, wherein the numerical model includes a digital low-pass filter.

14. A method according to claim 11, wherein the signals measured, generated, and compared are represented in time domain.

15. A method according to claim 11, wherein the signals measured, generated, and compared are represented in frequency domain.

16. A method according to claim 11, wherein the numerical model includes a convolution filter that includes a deconvolution of the first air pressure signal with the plurality of measured subsurface air pressure signals.

17. A system for detecting subsurface tunnels, the system comprising:
a first air pressure sensor located above the surface of the ground, the first air pressure sensor having a first output indicative of temporal variations in atmospheric pressure;
a second air pressure sensor located at a depth below the surface of the ground, and the second air pressure sensor having a second output indicative of subsurface air pressure variations at the second sensor's depth; and
a processor configured to execute a numerical model that employs the first output as an input to produce an optimal approximation of the second output, the numerical model including input parameters that represent the effects of the permeability of the earth and the depth of the second air pressure sensor, wherein the processor is adapted to detect the introduction of a tunnel by detecting changes over time in the input parameters.

18. A system according to claim 17, wherein:
the second air pressure sensor comprises one of a plurality of air pressure sensors located at a depth below the surface of the ground and horizontally separated, and each of the plurality of subsurface air pressure sensors having an output indicative of subsurface air pressure variations at the corresponding sensor's location; and
a processor adapted to detect the introduction of a tunnel by detecting spatial variation in the geophysically moderated influence of atmospheric pressure on the subsurface air pressure sensor outputs.

19. A non-transitory machine-readable storage medium containing machine-readable instructions configured to cause a processor of a system for detecting subsurface tunnels to perform operations comprising:
receiving a first air pressure signal from a first sensor positioned above or below ground;
receiving a second air pressure signal from a second sensor positioned at a depth relative to a surface of the earth and positioned at a greater depth below the surface of the earth than the first sensor to generate a second air pressure signal;
generating a third air pressure signal using a numerical model that employs the first air pressure signal as input to produce an optimal approximation of the second air pressure signal, the accuracy of such approximation being optimized by systematic adjustment of model input parameters that represent the effects of the permeability of the earth and the depth of the second sensor on the difference of the second air pressure signal from the first air pressure signal; and
detecting the introduction of a subsurface tunnel proximal to the second sensor based on a change in the accuracy with which the third air pressure signal approximates the second air pressure signal over subsequent time windows.

20. The non-transitory machine-readable storage medium according to claim 19, wherein the numerical model includes a finite difference formulation of the partial differential equation known as the Diffusion equation.

21. The non-transitory machine-readable storage medium according to claim 19, wherein the numerical model includes a digital low-pass filter.

22. The non-transitory machine-readable storage medium according to claim 19, wherein the systematic adjustment includes repeatedly generating the third air pressure signal over multiple successive time windows and wherein the detecting includes detecting a change in the values of the model input parameters that are found to produce the optimal approximation of the second air pressure signal by the third air pressure signal.

23. The non-transitory machine-readable storage medium according to claim 19, wherein the first, second, and third signals are represented in time domain.

24. The non-transitory machine-readable storage medium according to claim 19, wherein the first, second, and third signals are represented in frequency domain.

* * * * *